US009537522B2

(12) United States Patent
Ewing et al.

(10) Patent No.: US 9,537,522 B2
(45) Date of Patent: Jan. 3, 2017

(54) WIRELESS COMMUNICATIONS CAPABLE POWER DISTRIBUTION UNIT AND TECHNIQUES FOR COMMUNICATING THEREWITH

(71) Applicant: Server Technology, Inc., Reno, NV (US)

(72) Inventors: Carrel W. Ewing; James P. Maskaly, Sparks, NV (US); Erich Beyer, Reno, NV (US); Yael Campo, Reno, NV (US); Benjamin Haas, Reno, NV (US); Brian P. Auclair, Reno, NV (US)

(73) Assignee: Server Technology, Inc., Reno, NV (US)

( * ) Notice: Subject to any disclaimer, the term of this patent is extended or adjusted under 35 U.S.C. 154(b) by 0 days.

(21) Appl. No.: 14/216,279

(22) Filed: Mar. 17, 2014

(65) Prior Publication Data

US 2014/0329467 A1    Nov. 6, 2014

Related U.S. Application Data

(60) Provisional application No. 61/884,919, filed on Sep. 30, 2013, provisional application No. 61/817,794, filed on Apr. 30, 2013, provisional application No. 61/798,405, filed on Mar. 15, 2013.

(51) Int. Cl.
*H04B 1/3827* (2015.01)
*H04W 8/00* (2009.01)

(52) U.S. Cl.
CPC ........... *H04B 1/3827* (2013.01); *H04W 8/005* (2013.01)

(58) Field of Classification Search
CPC .............................. H05B 37/02; H04B 1/3827
USPC ..................................... 455/41.1, 41.2, 90.1
See application file for complete search history.

(56) References Cited

U.S. PATENT DOCUMENTS

| 7,043,543 | B2  | 5/2006  | Ewing et al. |
| 7,508,297 | B2* | 3/2009  | Martich et al. ............ 340/12.32 |
| 8,321,163 | B2  | 11/2012 | Ewing et al. |
| 8,494,661 | B2  | 7/2013  | Ewing et al. |
| 2006/0181398 | A1 | 8/2006 | Martich et al. |
| 2011/0062780 | A1* | 3/2011 | Verges et al. .................... 307/38 |
| 2011/0070834 | A1* | 3/2011 | Griffin et al. ................ 455/41.1 |
| 2012/0054527 | A1* | 3/2012 | Pfeifer et al. ................. 713/340 |
| 2012/0324242 | A1 | 12/2012 | Kirsch |
| 2013/0031399 | A1 | 1/2013 | Watson |
| 2014/0108846 | A1* | 4/2014 | Berke ..................... G06F 1/263 713/340 |

OTHER PUBLICATIONS

International Search Report and Written Opinion of International Application No. PCT/US/2014/030060; mailed Oct. 10, 2014; 12 pages.
Examination Report No. 1 for Australian Patent Application No. 2014233175; Date of Mailing: Jun. 10, 2016; 4 pages.

* cited by examiner

*Primary Examiner* — Tuan H Nguyen
(74) *Attorney, Agent, or Firm* — Perkins Coie LLP

(57) ABSTRACT

Methods, systems, and devices for wireless communication between a PDU and one or more devices within a limited communications range are described. A power distribution unit may be provided with a wireless communications module that may operate to communicate with user devices within a relatively close proximity. The wireless communications module may provide information reporting and may, in some examples, provide a user of the user device with configuration and other command capabilities.

15 Claims, 28 Drawing Sheets

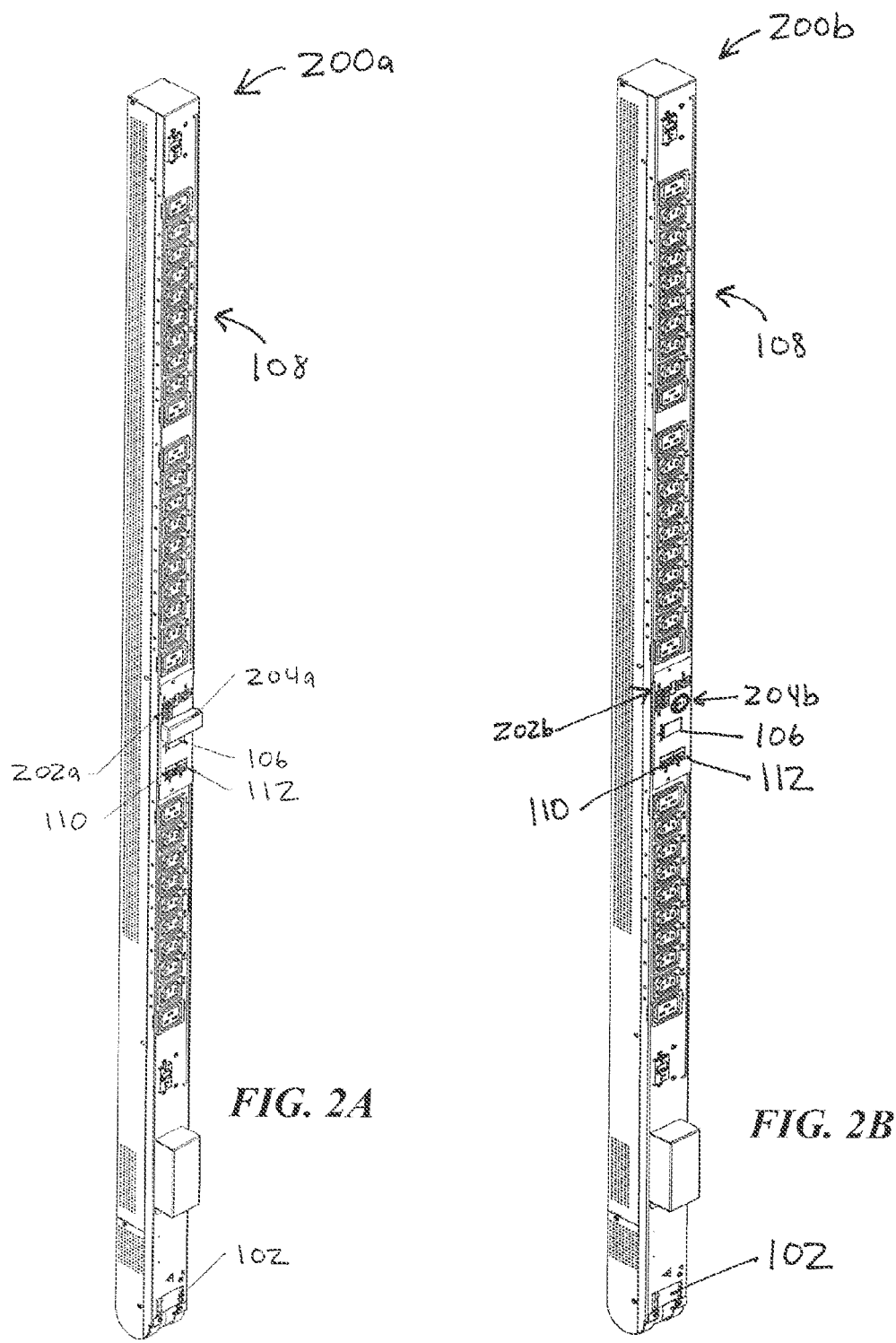

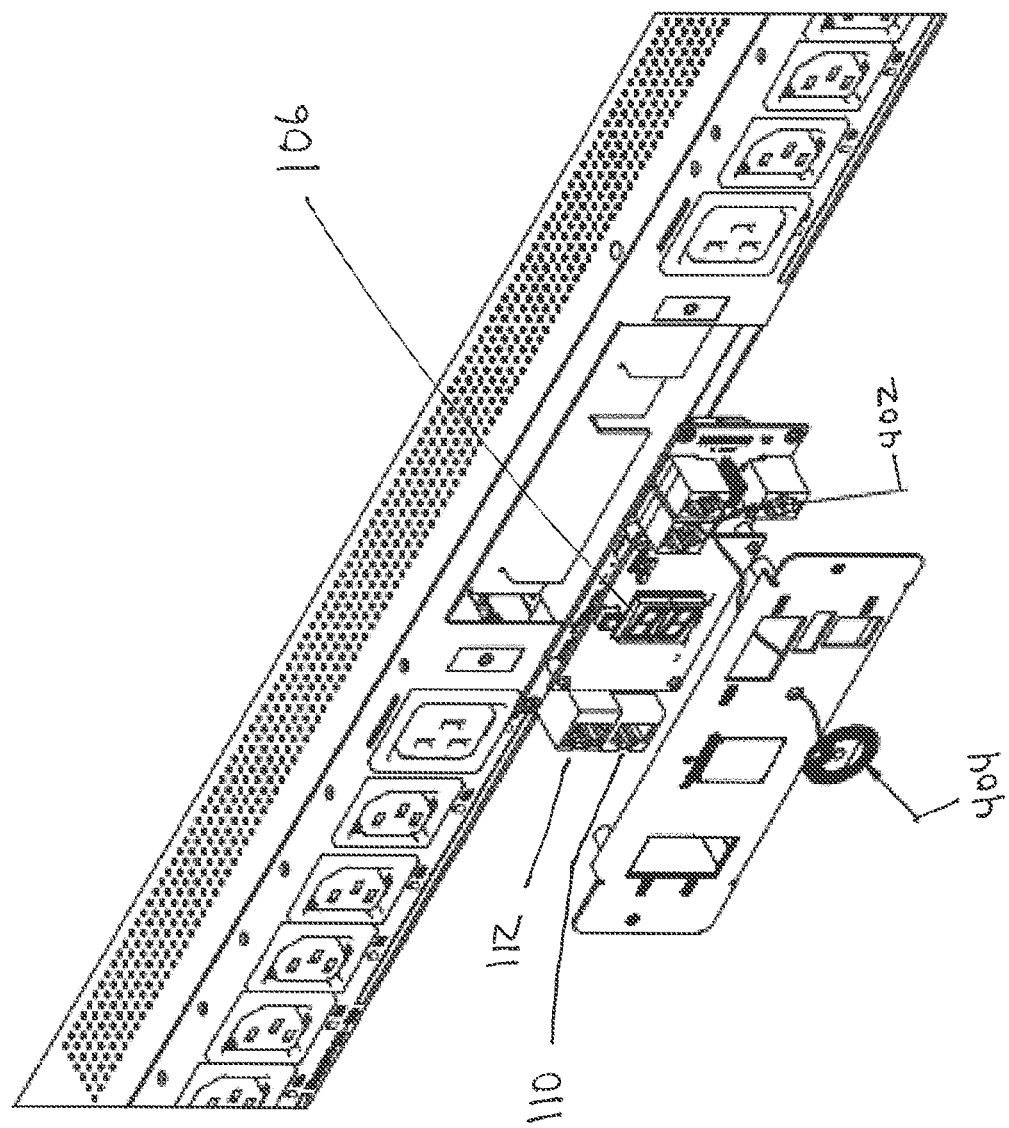

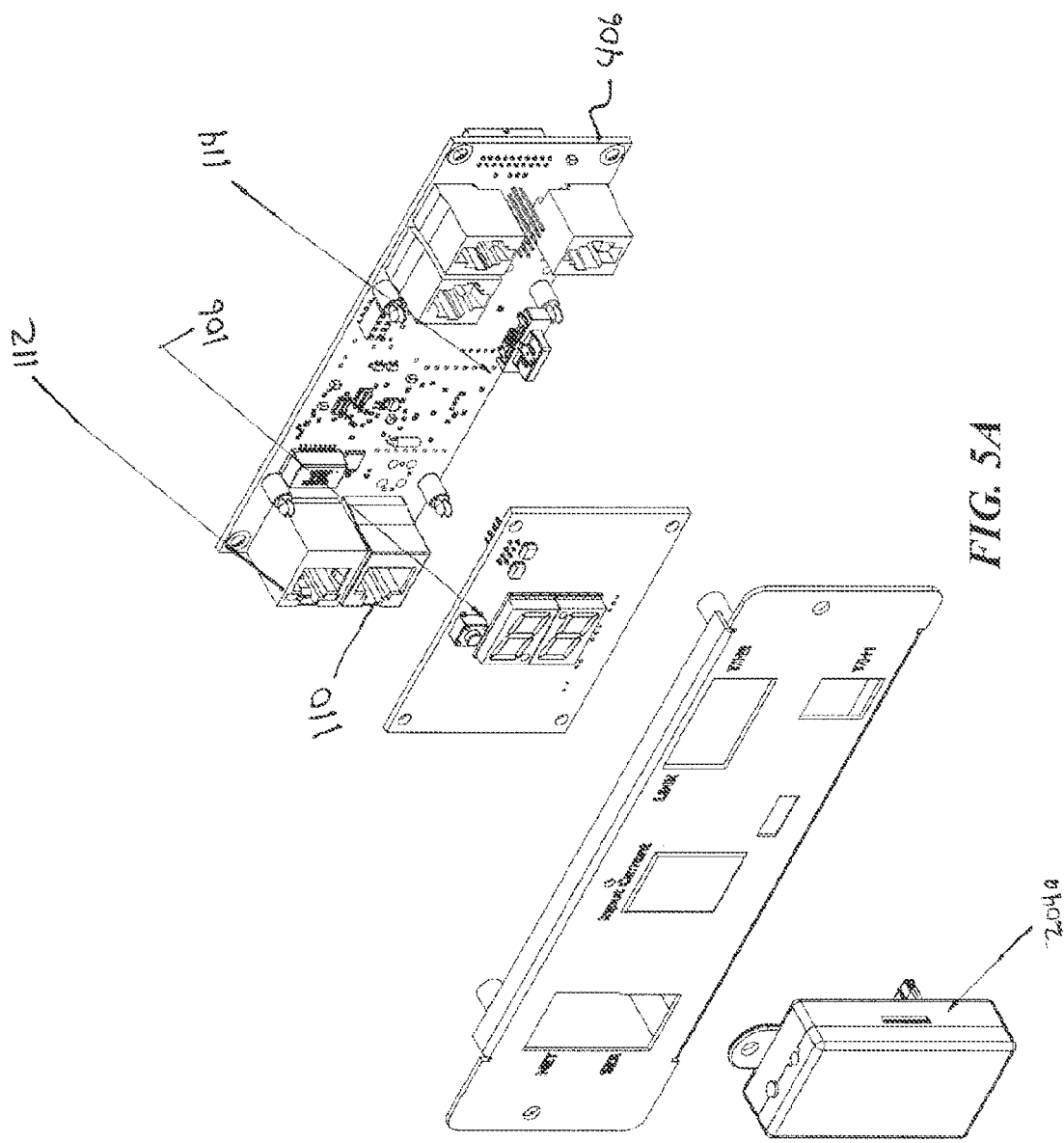

*FIG. 17*

WIRELESS COMMUNICATIONS CAPABLE POWER DISTRIBUTION UNIT AND TECHNIQUES FOR COMMUNICATING THEREWITH

CROSS-REFERENCE TO RELATED APPLICATIONS

This application claims priority to U.S. Provisional Patent Application Ser. Nos. 61/798,405 (filed Mar. 15, 2013), 61/817,794 (filed Apr. 30, 2013), and 61/884,919 (filed Sep. 30, 2013), each of which is incorporated herein by reference.

FIELD

The present disclosure is directed to power distribution apparatuses for distribution of power to electronic devices, and more specifically, to a power distribution unit having wireless communication capability with nearby devices and to various techniques for communicating with the power distribution unit via the nearby devices.

BACKGROUND

A conventional Power Distribution Unit (PDU) is an assembly of electrical outlets (also called receptacles) that receive electrical power from a source and distribute the electrical power to one or more separate electronic appliances. Each such unit has one or more power cords plugged in to one or more of the outlets. PDUs also have power cords that can be directly hard wired to a power source or may use a traditional plug and receptacle connection. PDUs are used in many applications and settings such as, for example, in or on electronic equipment racks. One or more PDUs are commonly located in an equipment rack (or other cabinet), and may be installed together with other devices connected to the PDU such as environmental monitors, temperature and humidity sensors, fuse modules, or communications modules that may be external to or contained within the PDU housing. A PDU that is mountable in an equipment rack or cabinet may sometimes be referred to as a Cabinet PDU, or "CDU" for short.

A common use of PDUs is supplying operating power for electrical equipment in computing facilities, such as data centers or server farms. Such computing facilities may include electronic equipment racks that comprise rectangular or box-shaped housings sometimes referred to as a cabinet or a rack and associated components for mounting equipment, associated communications cables, and associated power distribution cables. Electronic equipment may be mounted in such racks so that the various electronic devices are aligned vertically one on top of the other in the rack. One or more PDUs may be used to provide power to the electronic equipment. Multiple racks may be oriented side-by-side, with each containing numerous electronic components and having substantial quantities of associated component wiring located both within and outside of the area occupied by the racks. Such racks commonly support equipment that is used in a computing network for an enterprise, referred to as an enterprise network.

As mentioned, many equipment racks may be located in a data center or server farm, each rack having one or more associated PDUs. One or more such data centers may serve as data communication hubs for an enterprise. Furthermore, many PDUs include network connections that provide for remote control and/or monitoring of the PDUs. Such PDUs may include power control relays that may be actuated by a remote user to interrupt power to one or more of the outputs of a PDU. Furthermore, such PDUs may include the ability to report information related to the PDU to a user or system located remotely from the PDU. For example, a PDU may report a total amount of power being provided by the PDU to a power management system, which may monitor such information and provide such information to one or more users of the power management system, such as network administrators. PDUs may monitor one or more of several different parameters related to the power provided through the PDU, such as current, voltage, and/or some other power-related parameter. Many PDUs have local displays that may be used to provide information to a user. In some cases, additional information and/or functionality not available through the local display may be desired for a user of a user device (or smart device) that is located adjacent to the PDU. Additionally, in some wireless communications environments, wireless devices broadcast network information to facilitate discovery. Accordingly, a user device that wants to connect to a particular PDU needs to know the network identification information associated with that PDU to establish communications. Unfortunately, identifying a particular PDU from any number of PDUs in a datacenter based solely on broadcasted network information can be an arduous task.

Furthermore, in one traditional system, information from one or more PDUs may be transmitted wirelessly to a gateway that may collect PDU information and provide such information to a user, such as an operations user in a data center. Such systems may include an RF tag that is coupled with a serial port of a PDU, for example, and may receive information from a PDU and transmit the information wirelessly to the gateway. Such a system, however, does not provide a user adjacent to a PDU with the ability to perform any configuration or related functions with a PDU, and does not provide capability to provide interactions between a user of a device and a PDU. An example of a system is an RF tag and related system provided by RF Code of Austin Tex.

SUMMARY

Methods, systems, and devices for wireless communication between a PDU and one or more devices within a limited communications range are described. A power distribution unit may be provided with a wireless communications module that may operate to communicate with user devices within a relatively close proximity. The wireless communications module may provide information reporting and may, in some examples, provide a user of the user device with configuration and other command capabilities.

According to another set of embodiments, a power distribution apparatus is provided that comprises a housing having a power input; a plurality of power outputs disposed in the housing, each connectable in power supply communication with the power input and at least one electronic appliance; and a communications module that may provide communications between the power distribution apparatus and one or more other devices. The power distribution apparatus may further comprise a power-related information reporting system coupled with one or more power inputs or power outputs and configured to report power-related information derived from the power distribution apparatus to a remote system. In some embodiments, a display system is coupled with the power-related information reporting system, the display system comprising a digital visual display located on a face of the housing adjacent the plurality of power outputs, and configured to display at least a subset of the power-related information derived from the power sensor. In some embodiments, the communications module may include a wireless communications interface that may be used to communicate with devices within a relatively close proximity to the power distribution apparatus. In some embodiments, the wireless communications interface may be a near-field communications interface and/or a Bluetooth communications interface. The power input may comprise a polyphase power input, with different subsets of the plurality of power outputs being coupled with a different phase of power from the polyphase power input, and the display system may be configured to simultaneously display at least a subset of the power-related information derived from two or more of the different phases of power.

According to another set of embodiments, solutions are provided to the possible drawbacks of Bluetooth as compared to NFC with regard to selectivity. In particular, a solution is described to facilitate a user initiated limited discoverability feature. Essentially, in these embodiments, the Bluetooth modules connected to PDUs are, by default, not discoverable to a user device without some manual intervention from the user. For example, a user walking in a datacenter and scanning for Bluetooth devices would be unable to discover the Bluetooth enabled PDUs within range. According to some embodiments, a "discoverability" pushbutton on a Bluetooth module is described that, when pressed, allows that particular module to be discoverable for a pre-determined period of time (e.g., 1 minute). This discoverability feature allows a user device to connect to a desired PDU based solely on the user's knowledge of the location of the PDU in the datacenter. That is, the PDU can be discovered by a user device without the user device having advance knowledge of the network identification information associated with that PDU. Additionally, in some embodiments, an LED and/or other visible indicator on the Bluetooth module is described that may provide connectivity status of the desirable Bluetooth connection.

According to another set of embodiments, a user device and application executed on a user device is provided. The application may comprise a computer-readable medium storing instructions to be implemented by a wireless-enabled (e.g., Bluetooth enabled) user device having one or more processors, wherein the instructions, when executed by the one or more processors, cause the wireless user device to: electronically present a discovery mode user interface to a user via a display on the wireless user device, initiate a discovery scan for one or more wireless user devices broadcasting PDU discoverability information responsive to receiving first user input indicating initiation of the discovery scan, electronically present the one or more PDUs to the user via the display, and establish communications with a particular PDU of interest of the one or more PDUs electronically presented to the user.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label.

FIGS. 2A-2B illustrate power distribution units having wireless communications interfaces in accordance with various embodiments;

FIGS. 4A-4B and 5A-5B illustrate wireless communications interfaces of a power distribution unit in accordance with various embodiments;

FIGS. 14-17 show example user interfaces for presentation to a user on the user device in accordance with various embodiments;

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

The following patents and patent applications are incorporated herein by reference in their entirety: U.S. Pat. No. 7,043,543, entitled "Vertical-Mount Electrical Power Distribution Plugstrip," issued on May 9, 2006; U.S. Pat. No. 8,494,661, entitled "Power Distribution, Management, and Monitoring Systems," and issued on Jul. 23, 2013; and U.S. Pat. No. 8,321,163, entitled "Monitoring Power-Related Parameters in a Power Distribution Unit," and issued on Nov. 27, 2012.

Methods, systems, and devices for wireless communication between a PDU and one or more nearby devices are described. A power distribution unit may be provided with a wireless communication module (or interface) that may operate to communicate with user devices within a communications range. The wireless communications module may provide information reporting and may, in some examples, provide a user of the user device with configuration and other command capabilities. In some embodiments, configuration information may be provided from a user device via the wireless communications module to configure or reconfigure more than one PDU.

Figure 1:
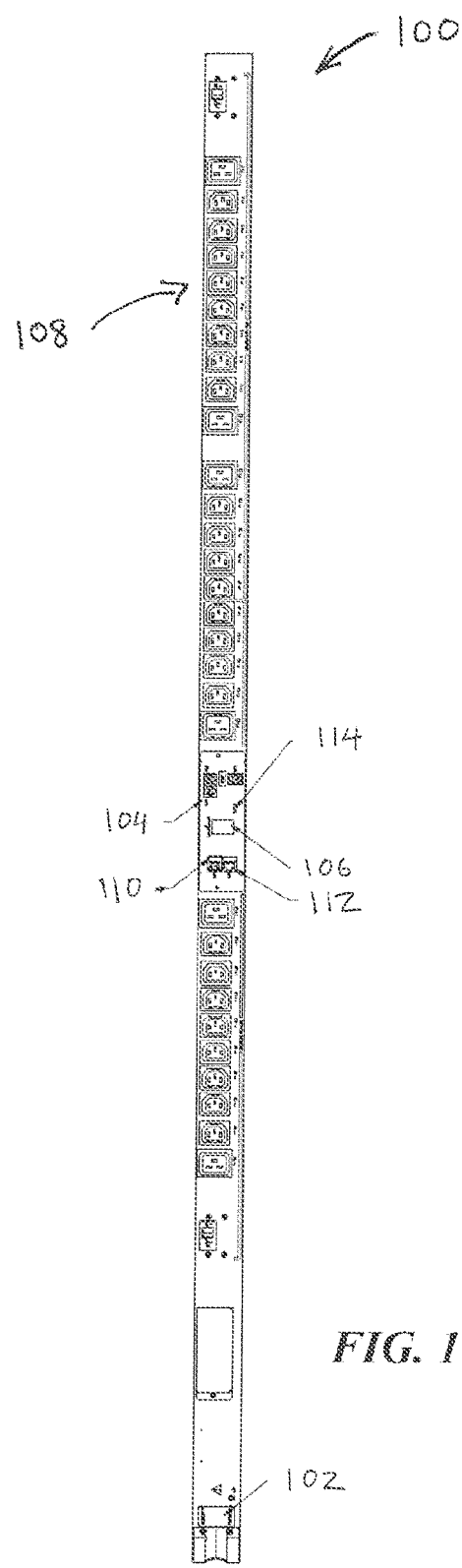
FIG. 1 illustrates a power distribution unit having a wireless communications interface in accordance with an embodiment.

With reference now to FIGS. 1 and 2, an illustration of an exemplary system of an embodiment is now described. A PDU 100 is illustrated that may supply power to one or more associated electronic appliances. The PDU 100 may have a housing that allows the PDU 100 to be mounted in an equipment rack. In the embodiment of FIG. 1, a PDU 100 is illustrated that may be mounted in an equipment rack in a vertical orientation. The PDUs employed herein may be any PDUs such as, PDU model CWG-24VDE415A1 provided by Server Technology of Reno, Nev. In other embodiments, PDUs may be provided that allow for mounting in a horizontal orientation, or either a vertical or horizontal orientation. Furthermore, a PDU, such as the PDU 100, may receive, and supply, either AC or DC power, and embodiments that provide AC power may receive single or multiple phase power through one or more power inputs. The PDU 100 is useable in a computer network, and may communicate over the computer network with a communications module 104, such as a network interface card or other suitable network communication device. The communications module 104 may be interchangeably described herein as a communications interface or wireless communications interface and may include one or more network interfaces that may be used for communication with one or more data networks. The communications module of various embodiments described herein also includes wireless communication capability and, in some embodiments, includes a wireless communications antenna.

According to some embodiments, the wireless communications may be provided to user devices, such as smartphones, tablet computers, and laptop or netbook computers, for example, that are within a communications range with the PDU 100. As will be readily understood, PDUs may be installed in equipment racks of a data center, in which multiple rows of equipment racks may have numerous different PDUs located within, in some cases, several feet of one another. When communicating with a PDU with a handheld user device, it may be beneficial for a user to have confidence that the PDU that is being accessed by the device is the particular PDU that is directly adjacent to the user device, rather than a PDU located in an adjacent equipment rack. According to some embodiments, the communications module 104 may include near-field communications (NFC) capability for wireless communications with a user device located within just a few inches or less of the wireless communications antenna. In other embodiments, the communications module may include a Bluetooth communications module or both a Bluetooth and NFC communications module. The Bluetooth communications device can have an antenna that is de-tuned so as to provide communications only within a relatively small radius of the wireless communications antenna, e.g., two feet. Additionally, in some embodiments, the transmit power of the Bluetooth radio may be reduced to limit wireless communications to a relatively small radius of the wireless communications antenna. In other embodiments, the user device may allow a user to select a PDU having a higher signal strength than a signal strength of other PDUs, which is presumably an adjacent PDU. The selected PDU 100 may be configured to provide an indication of the connection on a local display 106 of the PDU to allow a user to confirm that communications has been established with a particular PDU. In some embodiments, a "discoverability" pushbutton is disposed on the PDU or in an electronic cabinet to facilitate controlled discoverability with the PDU wireless module. While various radio-frequency based embodiments are described herein, other technologies may also be employed in certain embodiments to provide contactless communications between a device and a PDU, such as optical technologies (e.g., infrared communications), and the like. Various embodiments having wireless communications capability will be described in more detail below.

The PDUs of various embodiments may also include one or more processor module(s), and a memory that includes software that, when executed by processor module(s), cause the processor module(s) to perform various operations related to functions of the PDU. A power input module 102 receives input power and distributes power to the multiple power outputs 108, which in some embodiments may be outputs that are switchable, for example, through the use of one or more relays. The PDU 100 may include one or multiple sensors that may sense one or more parameters related to the power provided through the power input module 102 and/or power output through the multiple power outputs 106, such as current, voltage, power, and/or some other power-related parameter. The PDU 100 of FIG. 1 and the PDU 200 (inclusive of 200*a* and 200*b*) of FIG. 2, as mentioned, further includes a local display 106 that may be used to display one or more parameters related to the power provided through the PDU. The communications module 104 may also include a network interface port 110 (e.g., an Ethernet port), a serial console port 112 (e.g., an RJ11 port), and a wireless communication port 114. FIG. 2 illustrates PDU 200*a* having communications module 202*a* that includes a Bluetooth wireless communication port 204*a*. FIG. 2 illustrates PDU 200*b* having communications module 202*b* that includes an NFC wireless communication port 204*b*. While various embodiments describe PDUs for use in equipment racks, it will be understood that various embodiments may be implemented in other applications and systems. For example, relay modules having integrated sensors may be used in electric vehicle charging stations, or other applications that may use a traditional relay or other solid state device to provide or interrupt power to a power output.

Figure 3A:
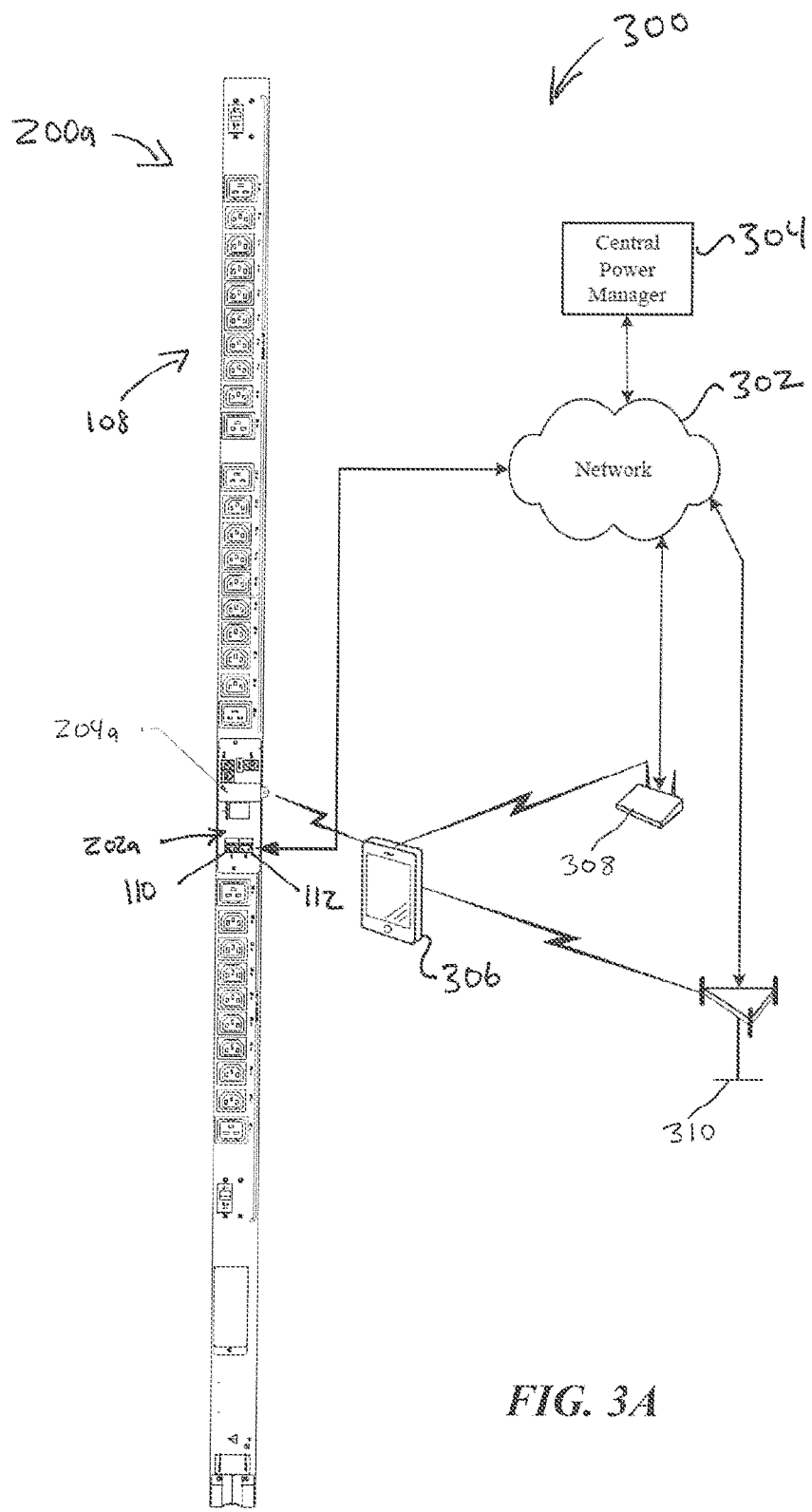
FIGS. 3A-3B illustrate power distribution units and various devices that may access the power distribution unit through one or more networks or communications interfaces.
Figure 3B:
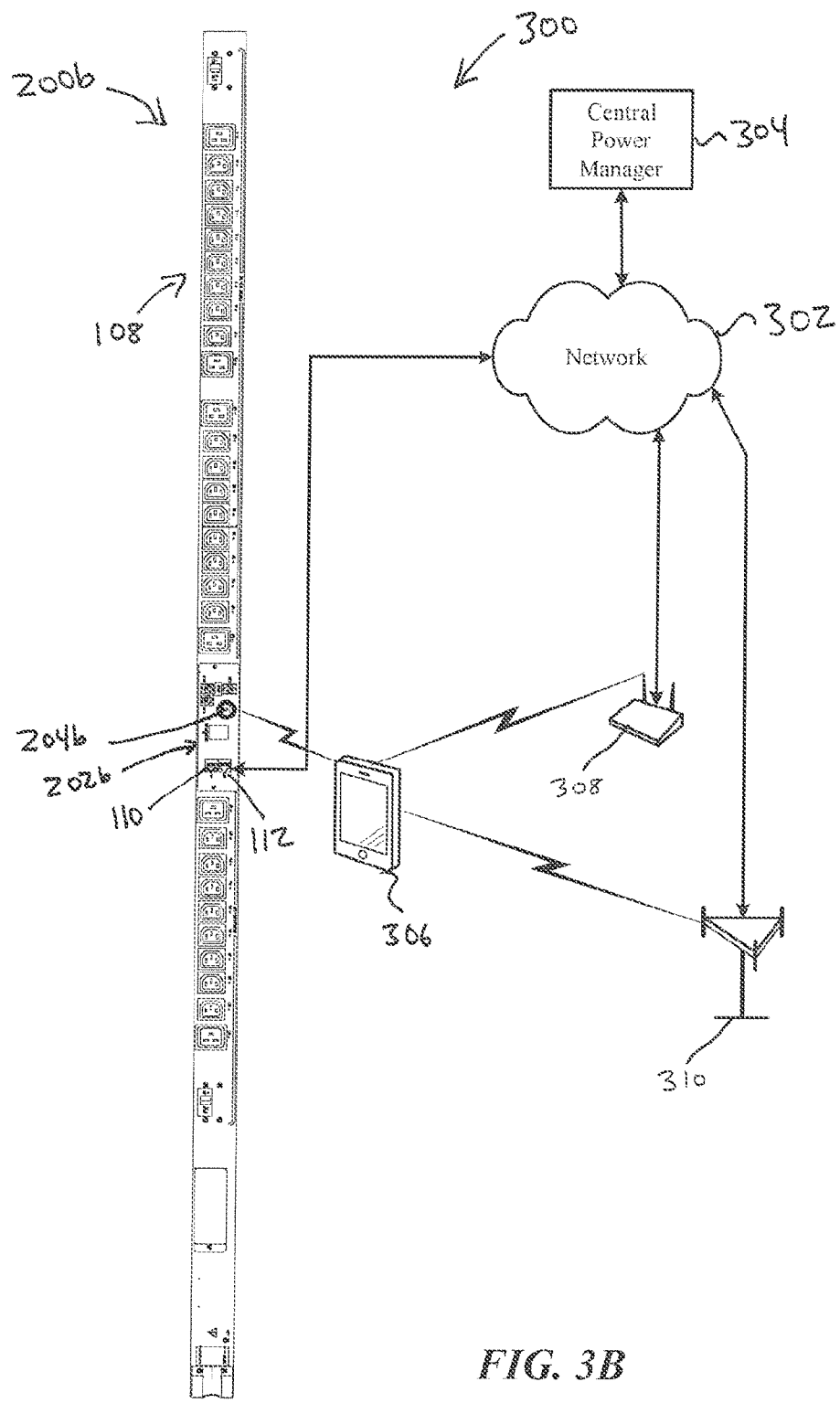

With reference now to FIG. 3A, a PDU 200*a* with wireless communications capability is illustrated in a networked environment 300. The PDU 200*a* itself may have a network connection to one or more networks 302, such as a local area network (LAN) and/or the Internet, which may be in communication with a central power manager 304. An example of a central power manager of various embodiments is the Sentry Power Manager provided by Server Technology of Reno, Nev. Additionally, a user device 306, such as a smartphone or tablet computer, for example, may wirelessly communicate with the PDU 200a through a wireless or contactless communications interface (e.g., the Bluetooth communications interface 204a of FIG. 3A or the NFC interface 204b of FIG. 3B). The user device may connect with multiple different types of radio access technologies, such as through a wireless (WiFi) router 308 with one or more networks and/or a cellular network 310. Thus, the user device may be in communication with both a central power manager and a local PDU. PDU communication with these networks, as mentioned, is conducted through a network interface which may include a communications module 202a, 202b such as a network interface card (NIC). The central power manager may reside in a workstation or other device that is used in the management of a data center or other enterprise management system, and may issue network commands over a network communications connection to PDU 200a, 200b, and one or more other PDUs, for example. In some embodiments, in a case where a separate wireless network is not available, the user device may establish an ad-hoc wireless network that may be used for communication between the PDU 200a, 200b and user device 306. The PDU network interface may include application firmware and hardware that allows the PDU to communicate with various remote systems or computers. In some embodiments, the PDU 200a, 200b includes a plurality of power outlets 106 associated with an intelligent power module (IPM), in which case an IPM may include a processor that performs one or more functions of the PDU for the associated power outlets.

Figure 4A:
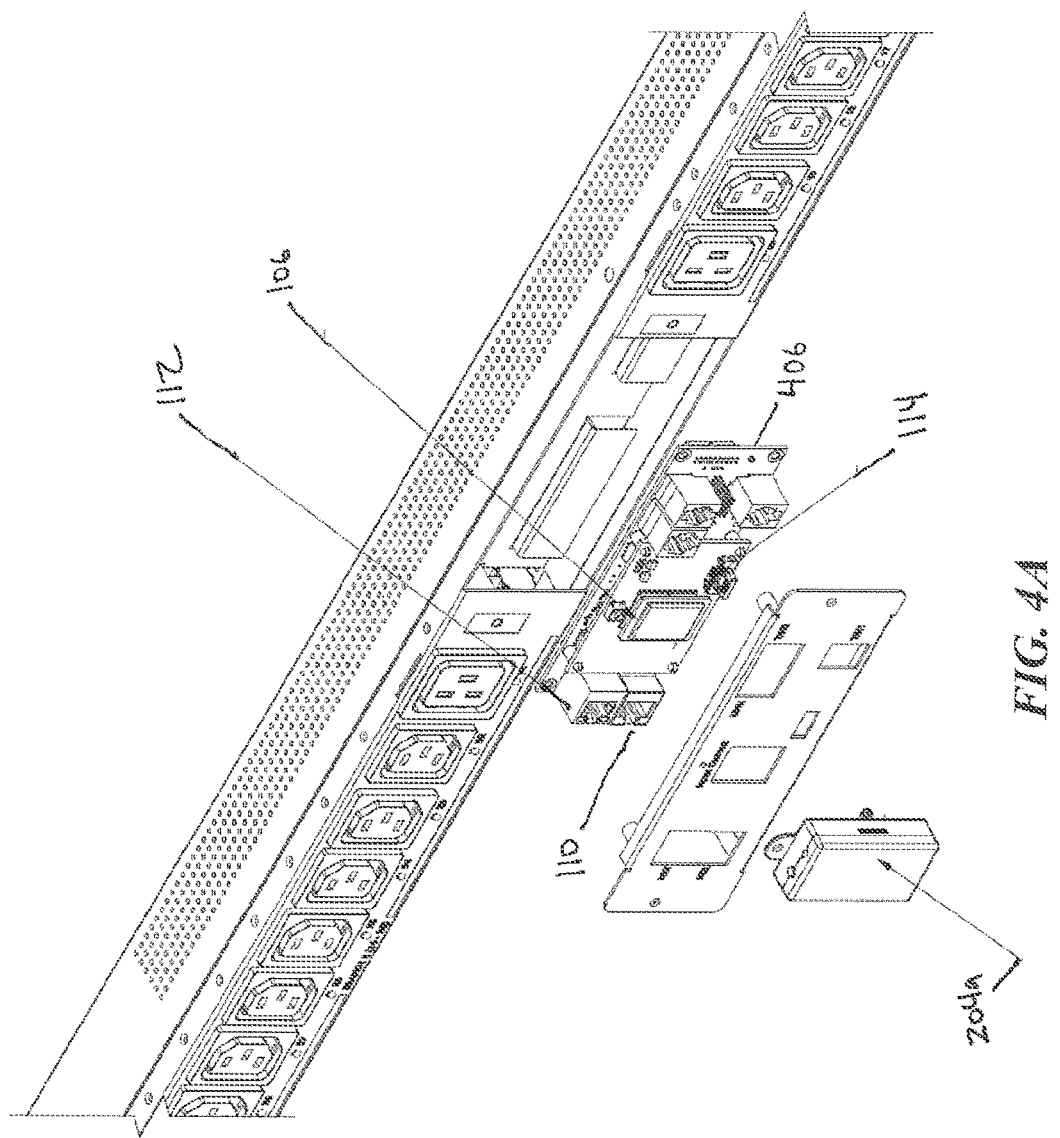
Figure 5B:
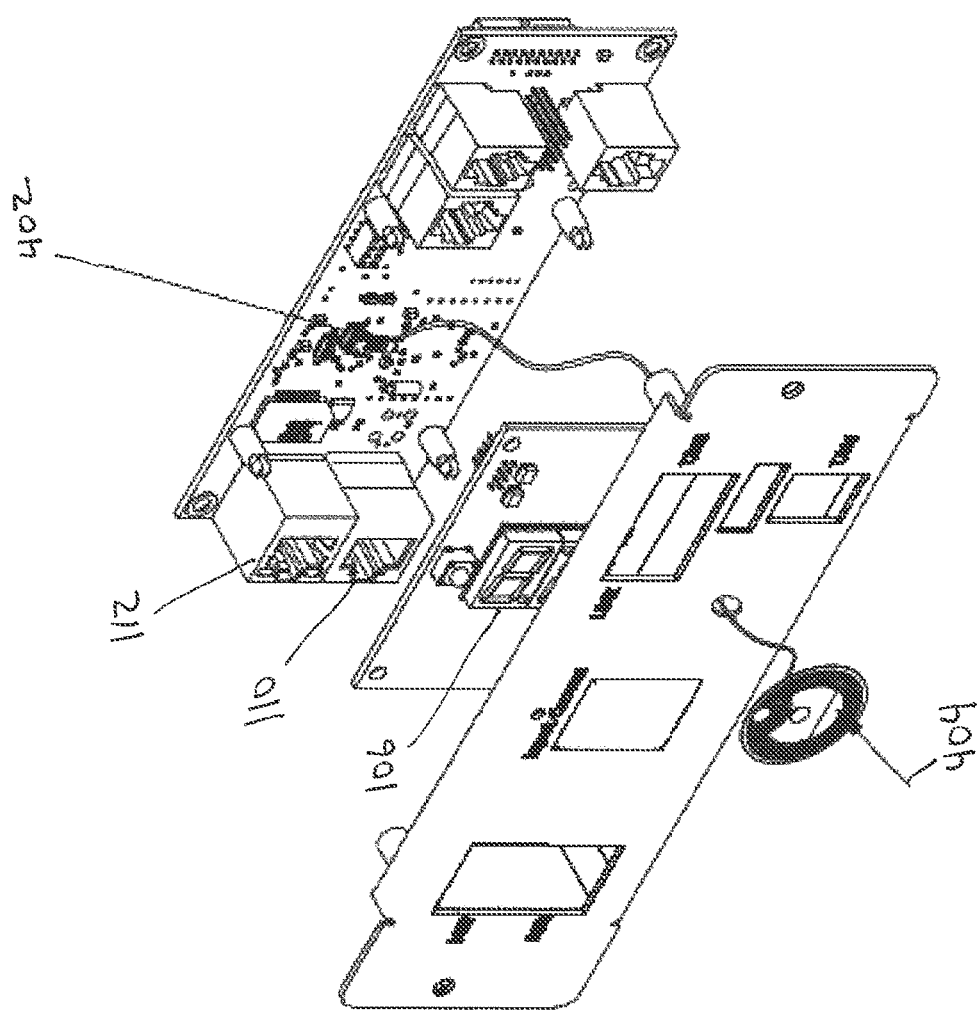

FIG. 4 (inclusive of FIGS. 4A and 4B) and FIG. 5 (inclusive of FIGS. 5A and 5B) are illustrations showing a wireless communications interface 202 (inclusive of 202a, 202b) of the PDU 200 (inclusive of 202a, 202b) according to various embodiments. The wireless communications interface 202 of FIGS. 4 and 5 includes a processor, a wireless communications port 114, the Bluetooth wireless module 204a, and the NFC wireless module 204b (inclusive of a near-field communications (NFC) tag 402 with an associated NFC antenna 404). The processor and the wireless communications port 114 are shown as a network interface card (NIC) 406. The NIC may also include one or more network interfaces 110, 112 and a local display 106. The Bluetooth module 204a can include the Bluetooth wireless controller described herein in the form of a self-contained module. According to an embodiment, the wireless communications port can be configured to interface with a wireless controller (e.g., Bluetooth wireless module). The wireless controller may include a commercially available NFC tag 402 or Bluetooth module 204a that would provide an interface between user devices 306 and one or more other systems within the PDU. In one embodiment, the NFC tag 402 may be a Panasonic MN63Y1208 NFC dual interface RFID chip that supports NFC. The NFC tag 402 may be a Panasonic MN63Y1210 NFC dual interface RFID chip that supports NFC and may couple with a UART serial interface. Of course, as will be readily recognized by one of skill in the art, numerous different suppliers of such parts are available, such as, for example, STMicro and NXP. The Bluetooth controller, also referred to at times herein as the Bluetooth module 204a, may be a KC-21 Class 2 Bluetooth Data Module available from KC Wirefree (www.KCWirefree.com), although it will be readily understood that other controllers or Bluetooth devices may be used for such functionality. The Bluetooth controller may be coupled to the PDU's communications module (e.g., NIC) via a universal asynchronous receiver/transmitter (UART) serial interface. As mentioned above, the PDU may include one or more processor module(s) that may control operation of the PDU and report power related parameters and/or other information/status to one or more remote systems, and the NFC tag 402 or Bluetooth module 204a may provide access to all, or a subset, of such operations and/or communications. For example, in some embodiments, a user with a Bluetooth enabled device and proper authentication and authorization may control relay modules to provide power and power cycling on-off for one or more of the corresponding power outlets. In some embodiments, a user with an NFC enabled device and proper authentication and authorization may also control relay modules to provide power and power cycling on-off for one or more of the corresponding power outlets. Further, processor module(s) may receive sense signals from sensors within the PDU, such as input and/or output voltage sensing devices, input current sensing devices, environmental sensors (e.g., temperature and humidity devices), etc. The processor module(s) may use this information to determine the power supplied through an outlet, aggregate power supplied by the PDU, current usage of one or more outlets, voltage of the power input and/or one or more outlets, and the like, with such information provided through the network interface to a remote network power manager and/or to an NFC or Bluetooth-enabled smart device via the wireless controller. The PDU, in some embodiments, may also include a display, for example a single-digit or multi-digit LED display, to provide a visual indication of voltage, current or other power metrics locally at the PDU.

Figure 6A:
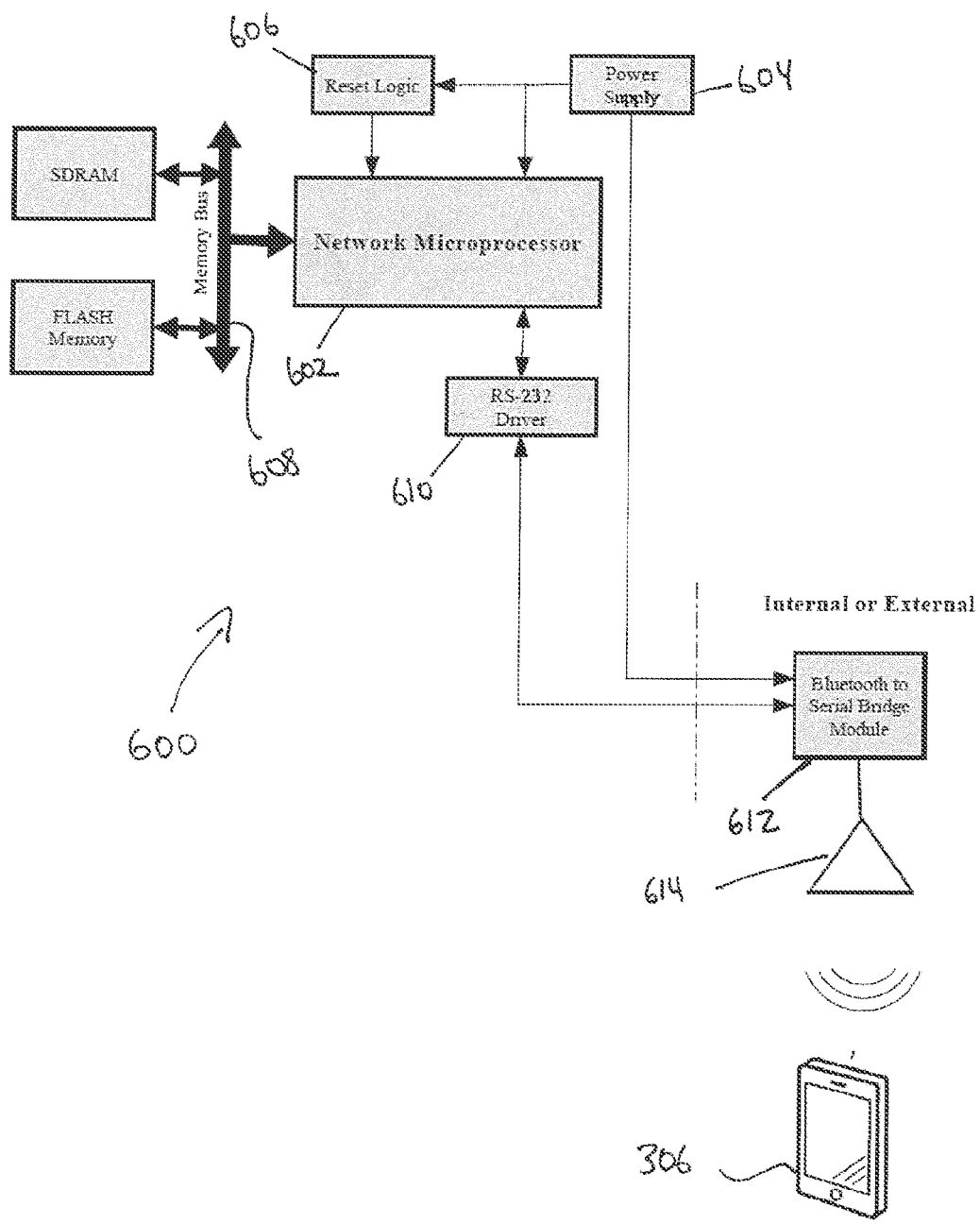
FIGS. 6A-6B illustrate block diagrams of wireless communications interfaces in accordance with various embodiments.

FIG. 6A is a block diagram of a communications module 600 that supports Bluetooth communications, according to various embodiments. In the illustration of FIG. 6A, a network processor 602 is connected with multiple other devices, including a power supply 604 and reset logic 606, a memory bus 608 (via an RS-232 Driver). The serial interface may include an RS-232 driver 610 that is coupled with an RJ45 or other type of serial port. Additionally, although not shown, an interface to an internal bus, such as an 12C bus, and network interfaces such as an Ethernet interface or serial interface may also be included. The Ethernet interface may include a 10/100 Ethernet PHY module that is coupled with an RJ45 Ethernet Magjack. Memory bus may be connected with one or more of various different types of memory, such as SDRAM and FLASH memory modules. The network processor may be connected to the wireless communications ports. As mentioned above, PDUs of various embodiments may include wireless communications of any of a number of different radio access technologies.

With reference again to FIG. 6A, a block diagram illustration of one example of a radio access technology is discussed. In this embodiment, a Bluetooth radio is incorporated into a PDU, which may provide communications with a Bluetooth enabled user device. In the illustration of FIG. 6A, a Bluetooth to serial bridge module 612 is also coupled with network microprocessor 602. The Bluetooth to serial bridge module 612 may allow a Bluetooth enabled device to access the network microprocessor through a serial interface. According to some embodiments, a Bluetooth enabled user device may connect to the PDU via the Bluetooth antennae 614 and Bluetooth to serial bridge module 612. The network microprocessor 602 may execute code that provides an interface to such a user device with information related to power parameters of the PDU, for example, and may also allow the user device to access and change various different configuration and control information of the PDU. As will be recognized, in many applications Bluetooth communications may be maintained over distances of approximately 10 meters (32 feet), and in some cases larger distances may be achieved. As will also be recognized, in many environments that utilize PDUs, numerous different PDUs may be located within such a radius. Accordingly, in some embodiments, a list of PDUs within range of the user device may be provided to the user, along with a signal strength of each PDU. The user may then select the PDU with a signal strength that is at or above a certain threshold, which is likely the PDU that is closest in proximity to the user device. However, a more reliable approach to identifying a particular PDU of interest is also is discussed below.

Figure 6B:
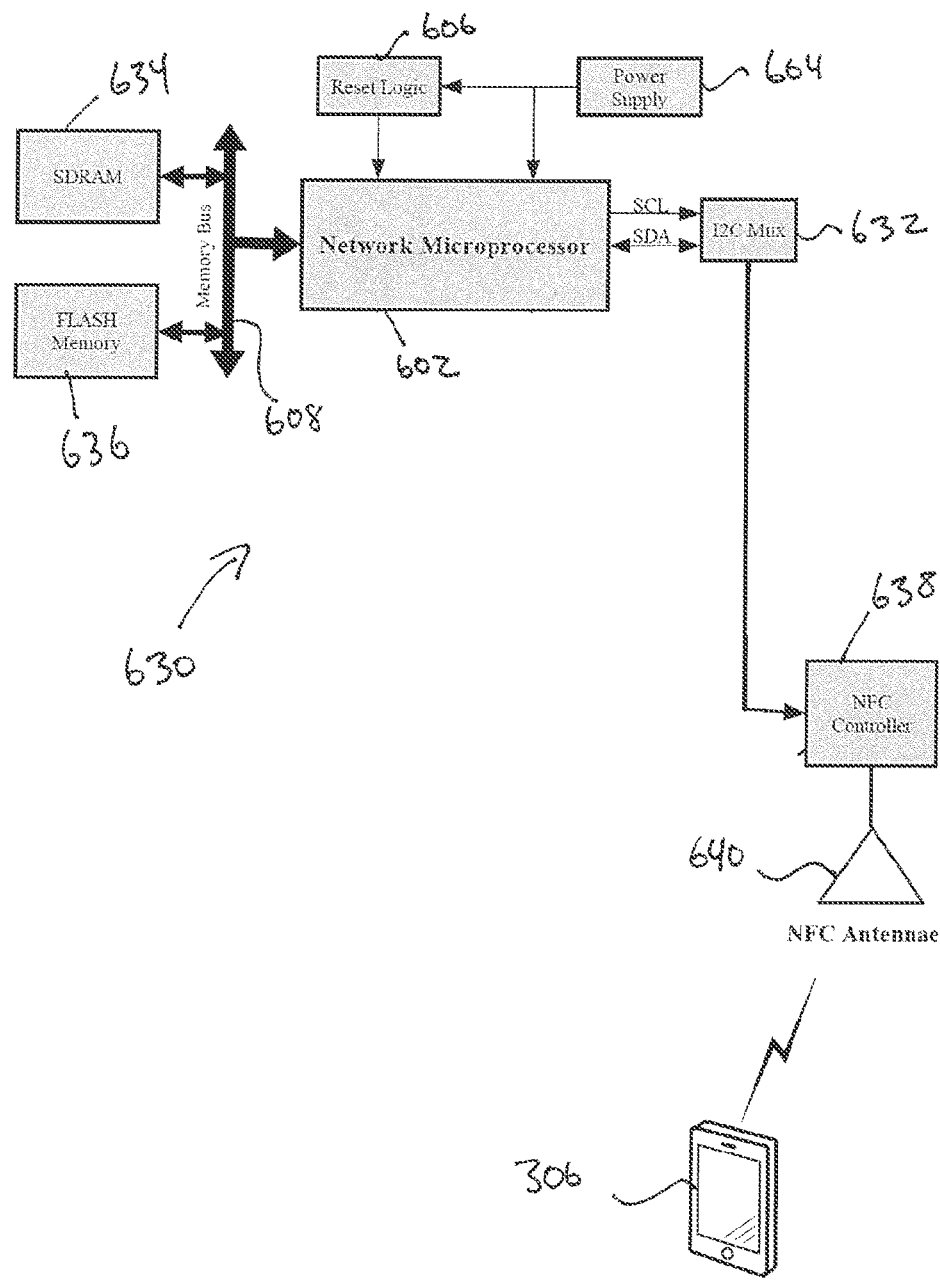

FIG. 6B is a block diagram of a communications module 630 that supports NFC communications, according to various embodiments. In the illustration of FIG. 6B, a network processor is connected with multiple other devices, including the power supply 604 and reset logic 606, a memory bus 608, an interface to an internal bus 632, such as an I2C bus, and network interfaces such as an Ethernet interface or serial interface. The Ethernet interface may include a 10/100 Ethernet PHY module that is coupled with an RJ45 Ethernet Magjack. The serial interface may include an RS~232 driver that is coupled with an RJ45 serial port. Memory bus 608 may be connected with one or more of various different types of memory, such as SDRAM 634 and FLASH 636 memory modules. The network processor 602 may be connected to an I2C bus via an I2C multiplexer that enables serial bus communication between a number of I2C ports and additionally an NFC controller 638. Each I2C port may be associated with, for example, an Intelligent Power Manager (IPM) module that includes a separate processor and multiple power outputs. The NFC controller 638 may communicate with a user NFC enabled device 306 via one or more NFC antennae 640.

Figure 7A:
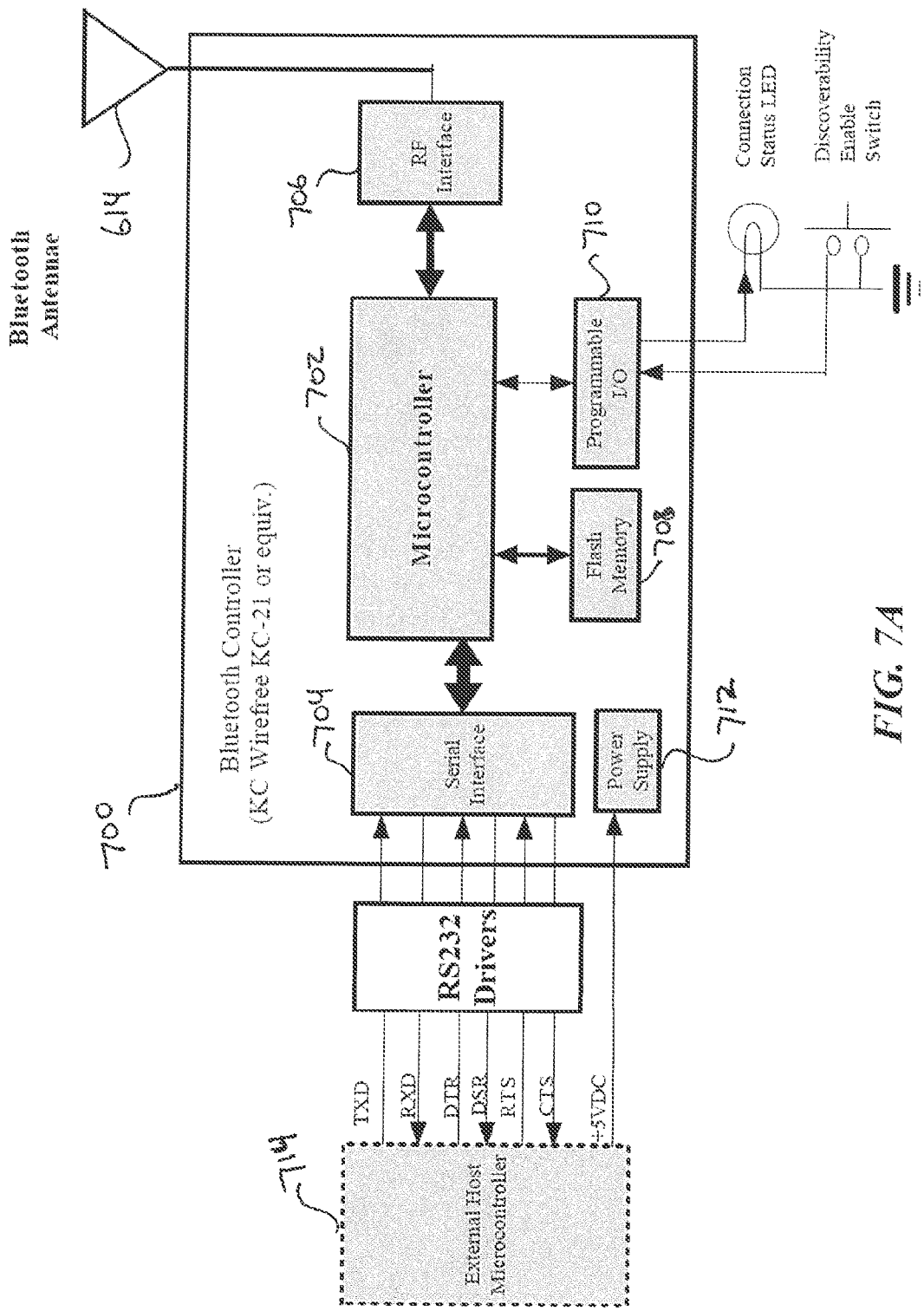
FIGS. 7A-7B illustrate block diagrams showing wireless controllers in accordance with various embodiments.
Figure 8:
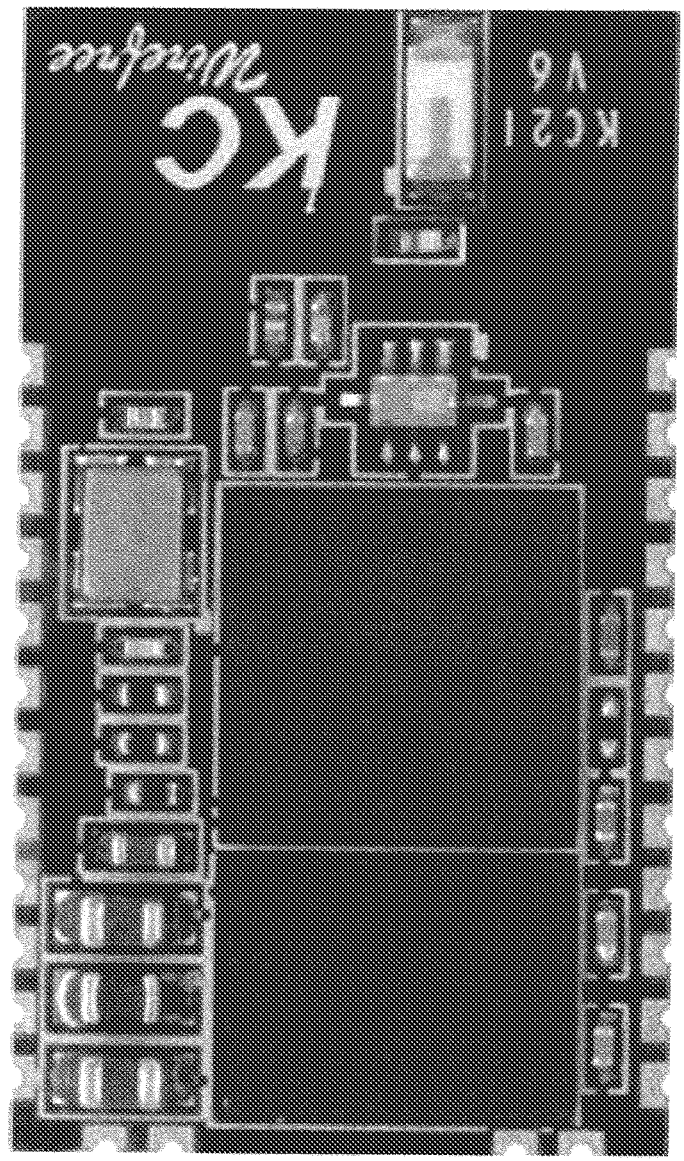
FIG. 8 shows a printed circuit board illustrating a representative Bluetooth wireless controller in accordance with various other embodiments.

FIG. 7A is a block diagram of a Bluetooth controller 700 according to various embodiments. The Bluetooth controller 700 includes a microcontroller 702, a serial interface 704, an RF interface 706, a memory module 708, programmable I/O 710, and a power supply 712. The serial interface may be coupled with an external host microcontroller 714, such as the network processor 602 of FIGS. 6A, 6B, for example. In some embodiments, the Bluetooth controller 702 can be initialized for facilitating communication between a user device and the external host microcontroller. Additionally, the Bluetooth controller 702 can be configured with controlled discoverability to facilitate use with a plurality of other Bluetooth controllers in, for example, a large datacenter. Further, in some embodiments the Bluetooth controller may also include a visible indicator to indicate when it is connected with a user device (e.g., smartphone). FIG. 8 shows a printed circuit board of illustrating an example of a representative Bluetooth wireless controller 800 in accordance with various other embodiments. In particular, the example of FIG. 8 illustrates the KCWirefree KC 21 device.

One possible drawback of Bluetooth as compared to near field communications (NFC) is in regards to selectivity. NFC by design has very limited range (roughly 10-20 mm). Therefore, one can be highly confident that a particular PDU one is attempting to connect to and obtain information from is in very close proximity to the user device. However, in many applications the range for a Bluetooth controller or module is approximately 10 meters (32 feet), and in some cases, even longer distances may be achieved. Such range may be inconvenient as a Bluetooth-enabled user device can potentially connect and communicate with any number of PDUs with attached Bluetooth modules or controllers, particularly in a datacenter environment. This makes it difficult to identify with a high level of confidence which PDU a user device is connecting with. In provisional application No. 61/798,405, filed Mar. 15, 2013, which is included herein by reference, several techniques that were identified to mitigate this dilemma. For example, one possible solution is to detune the antennae or reduce the RF power of the Bluetooth radio (both of which effectively limit reception range). Another possible solution, was to have the PDU identify that it had been connected with by placing a specific blinking pattern on its local LED display so that the user could identify which specific PDU he had connected with.

As discussed above, a PDU can be equipped with an NFC tag. The NFC tag can include communication information for establishing a Bluetooth connection. In particular, the communications information may include, but is not limited to, a MAC address for the Bluetooth controller associated with the PDU. Accordingly, when a Bluetooth enabled user device is positioned into a location proximate the NFC tag, the NFC tag provides the Bluetooth enabled user device with the appropriate MAC address for establishing a Bluetooth connection. Reception of the communications information via NFC may automatically launch the user device application on the user device and establish a Bluetooth connection between the user device and the PDU. Additionally, reception of the communications information via NFC by the user device may also cause the user device to (by way the application) access information from the PDU and display the accessed information via a user interface on the user device.

In some embodiments, another solution is described herein to provide a user initiated limited discoverability feature of a Bluetooth module. Essentially, in these embodiments, the Bluetooth modules connected to a PDU are, by default, not discoverable to a user device without some manual intervention from the user. For example, a user walking in a datacenter and scanning for Bluetooth devices would be unable to discover the Bluetooth enabled PDUs within range. However, in some embodiments, a pushbutton on a Bluetooth module, when pressed, allows that particular module to be discoverable for a pre-determined period of time (e.g., 1 minute). The pre-determined period (or discovery period) may be configurable. The discovery period allows the user to initiate a scan for Bluetooth devices after pressing the pushbutton on a particular PDU with which the user wants to connect. Only the selected PDU (i.e., the PDU associated with and/or otherwise communicatively coupled to the Bluetooth module on which the pushbutton was pressed) is discoverable to the user device (e.g., is displayed to the user via the user device). The user can then select the PDU to initiate a connection with the user device. In addition, in some embodiments, an LED and/or other visible indicator on the Bluetooth module may provide connectivity status of the desirable Bluetooth connection. For example:

| LED State | BT Connectivity Status |
| --- | --- |
| OFF | Discovery disabled, Not currently connected with a Bluetooth device |

-continued

| LED State | BT Connectivity Status |
|---|---|
| ON (Blinking) | Discovery enabled, Not currently connected with a Bluetooth device (50% duty cycle with a 600 ms period) |
| ON (continuous) | Discovery disabled, Currently connected with a Bluetooth device |

Together, the manual user intervention (e.g., discover pushbutton) and the visible indicator on the PDU (e.g., the LED), provide the user with confidence that the user device has connected with the intended Bluetooth PDU.

Figure 7B:
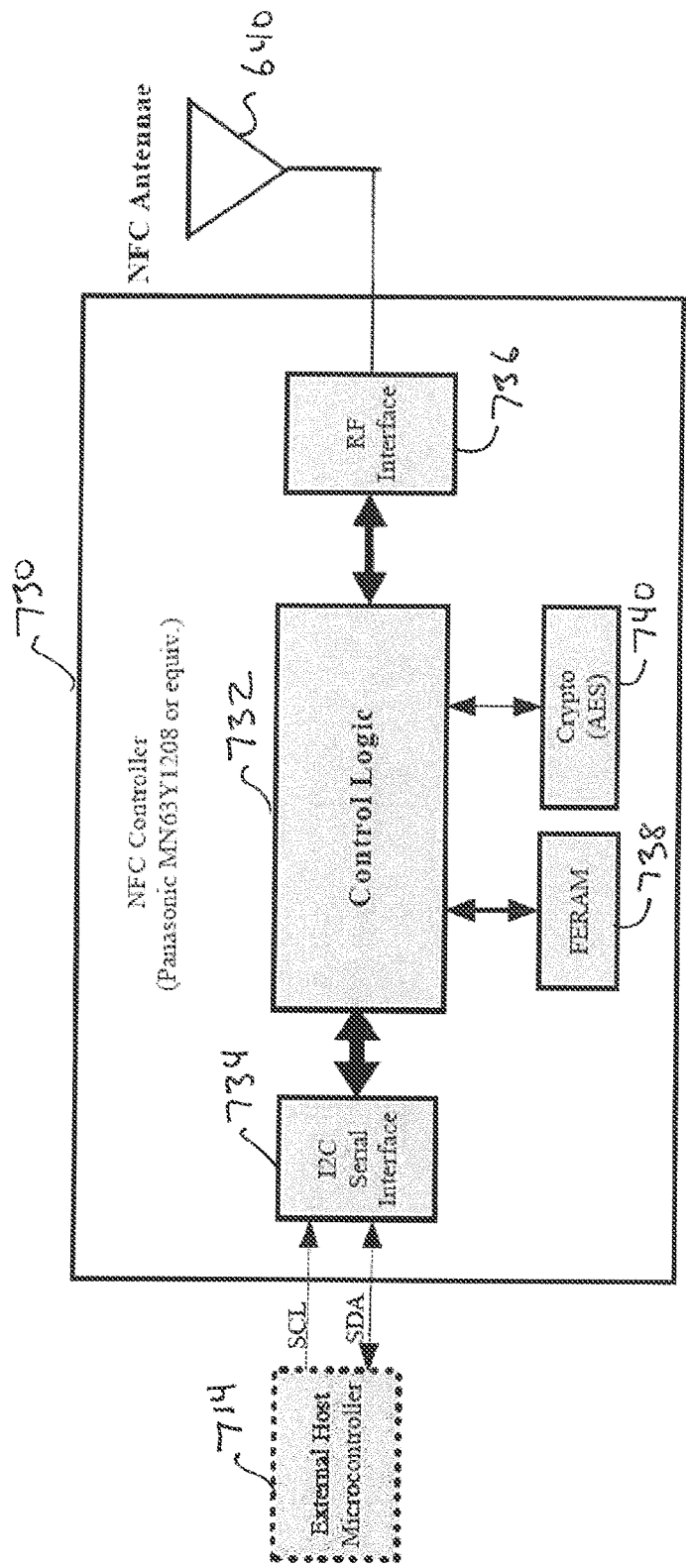

FIG. 7B is a block diagram of a NFC controller 730 according to various embodiments. The NFC controller includes control logic 732, an I2C serial interface 734, an RF interface 736, a memory module 738 and a cryptography module 740. The I2C interface may be coupled with an external host microcontroller 714, such as the network processor of FIG. 6, for example. The control logic may periodically be used to write information to the memory module 738, which may include, for example non-volatile ferroelectric Ram (FERAM), that may also be written with data by the host microcontroller. In some embodiments, information related to the PDU, such as a PDU IP address, serial number, and/or model number may be written to the memory module 738. Such information may be read by an NFC-enabled user device and used to provide information that the NFC enabled device may use to establish a tunnel to external host microcontroller. Tunneling operations, according to exemplary embodiments, is described in more detail below. In some embodiments, the NFC tag may store a wireless access security key and/or Bluetooth radio pairing information that may be used to establish communications using a different radio access technology that may support a higher bandwidth port or enhanced range of communications between the NFC enabled device and PDU. According to some other embodiments, the host microcontroller may periodically write power-related parameters of a PDU into the memory module, which may then be accessed by a user via an NFC enabled user device to obtain various power-related parameters of the PDU. The information may be updated periodically, based on the frequency of change of the particular parameter, so that the NFC enabled device may obtain real-time or near-real-time information related to power parameters of the PDU. The control logic may also, in some embodiments, allow for a connected NFC device to tunnel to the host microcontroller via the NFC controller. The NFC device, in such cases, would be in communication with the host microcontroller (such as network microprocessor of FIG. 6), which may provide an interface to the NFC device for access to one or more power related parameters, and/or PDU control/configuration information. Various communications flow between the NFC controller, PDU network processor, and NFC device will be described in more detail below. In some embodiments, the PDU may be configured by an administrator to enable/disable PDU access through the NFC tag, and/or to limit the types of operations or IO data that may be accessed via the NFC tag. In such a manner access to the PDU through the NFC tag may be controlled.

Figure 9A:
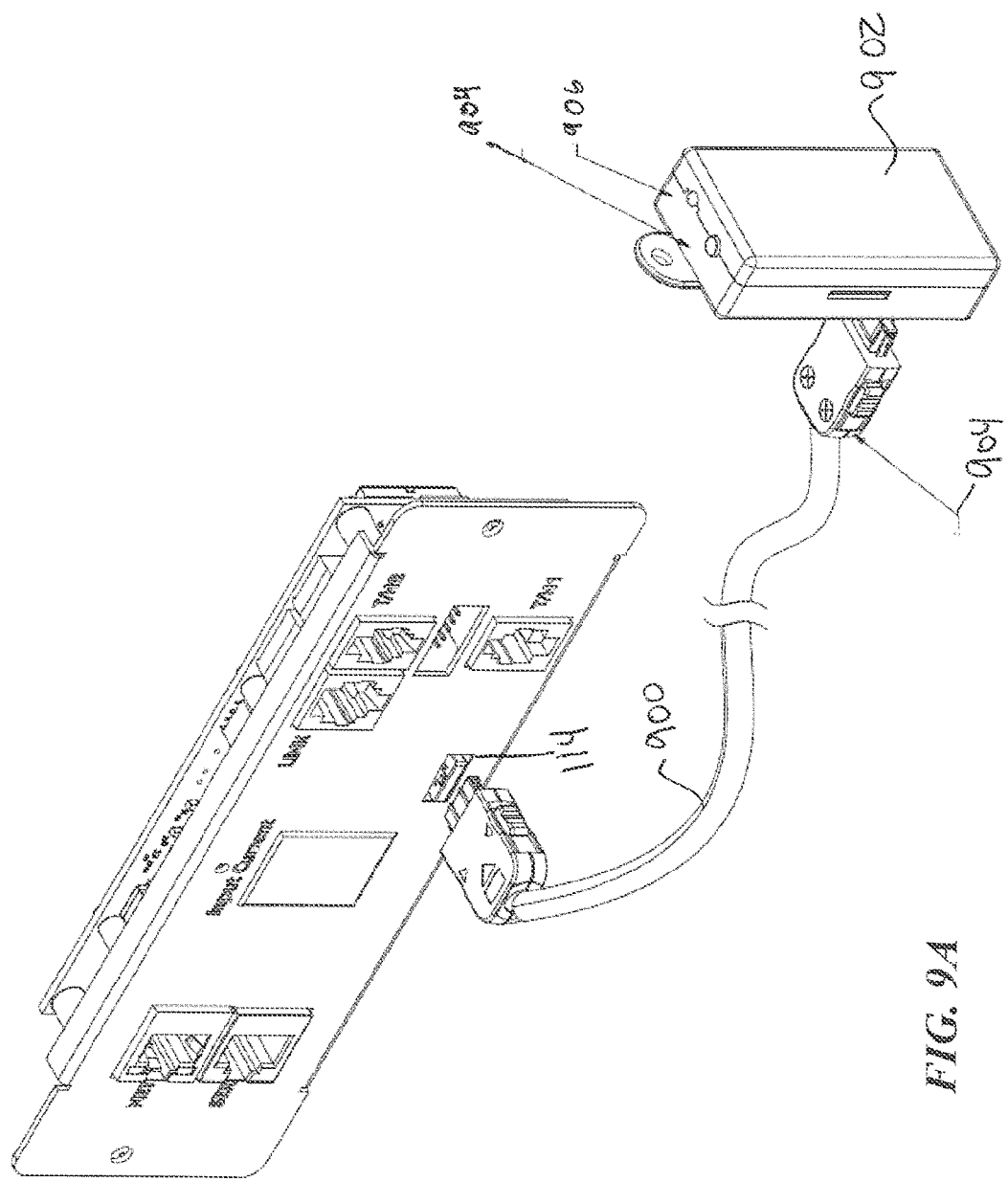
FIGS. 9A-9B illustrate wireless controllers, respectively, in the form of tethered Bluetooth and NFC wireless modules (i.e., dongles) connected to a power distribution unit in accordance with various embodiments.

FIG. 9A illustrates a tether 900 for a Bluetooth wireless controller according to some embodiments. The tether may be provided to couple the wireless communication interface or port 114 to a wireless controller 902 (e.g., Bluetooth wireless module 204a). The tether 900 may be, for example, a data cable such as RS-232, that has locking connectors 904 at either end to facilitate remote placement and/or mounting of the wireless controller. In these embodiments, the wireless controller 902 and the tether 900 may, together, be referred to as a "dongle." For example, one end of the tether may be secured to the wireless interface or port 114 of the NIC, and the other end secured to the wireless controller 902. Such embodiments may allow a user of the user device to have more convenient access to a "discoverability" push button 904 and/or a connection status LED 906. Although not shown for simplicity, in some embodiments, a Bluetooth controller may be embedded within the PDU (e.g., within the housing of the PDU). Alternatively, the Bluetooth controller may be directly attached to the housing of the PDU in the form of a separate detachable module as shown in earlier Figures. In such cases, a tether can still be utilized to extend the reach or range of the discoverability pushbutton, the LED (or other visible indicator), and/or a Bluetooth antenna. For example, access to the "discoverability" push button 904 and "connectivity status" LED 906 from outside a rack in which the Bluetooth module and PDU reside may be useful. In yet other embodiments, the tether may be replaced with an additional leg of wireless communication (e.g., the Bluetooth module could wirelessly communicate with the PDU NIC). In such cases, the Bluetooth module may effectively function as a Bluetooth repeater with two or more Bluetooth controllers. However, other wire free technologies may also be utilized including combinations and/or variations thereof.

Figure 9B:
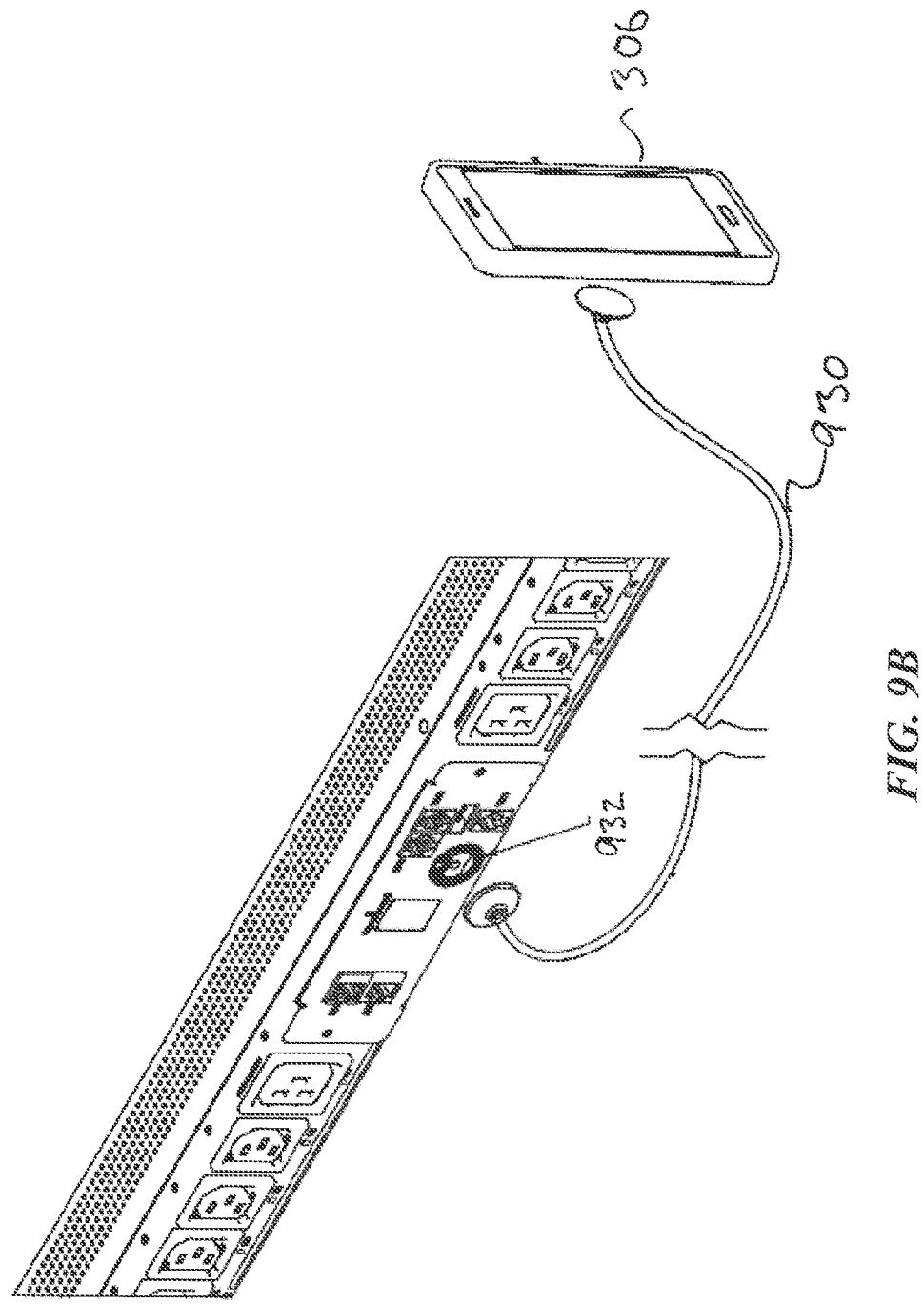

FIG. 9B illustrates a tether 930 to facilitate NFC wireless communications according to some embodiments. In some implementations, a relatively short range may be inconvenient for holding the NFC enabled device 306 within range while communicating with the PDU. In some embodiments, a tether 930 may be provided that couples the NFC tag or antenna 932 with an NFC enabled user device that is located some larger distance away. The tether 900 may be, for example, a coaxial cable that has antennas located at either end. The antenna on one end may be secured in proximity to the antenna portion of the NFC tag, and the antenna on the other end may be secured in proximity to the NFC tag's antenna of the user device 306. Such embodiments may allow a user of the user device 306 to have more convenient placement of the device, while also providing additional confidence that the proper PDU is connected to the user device.

Figure 10A:
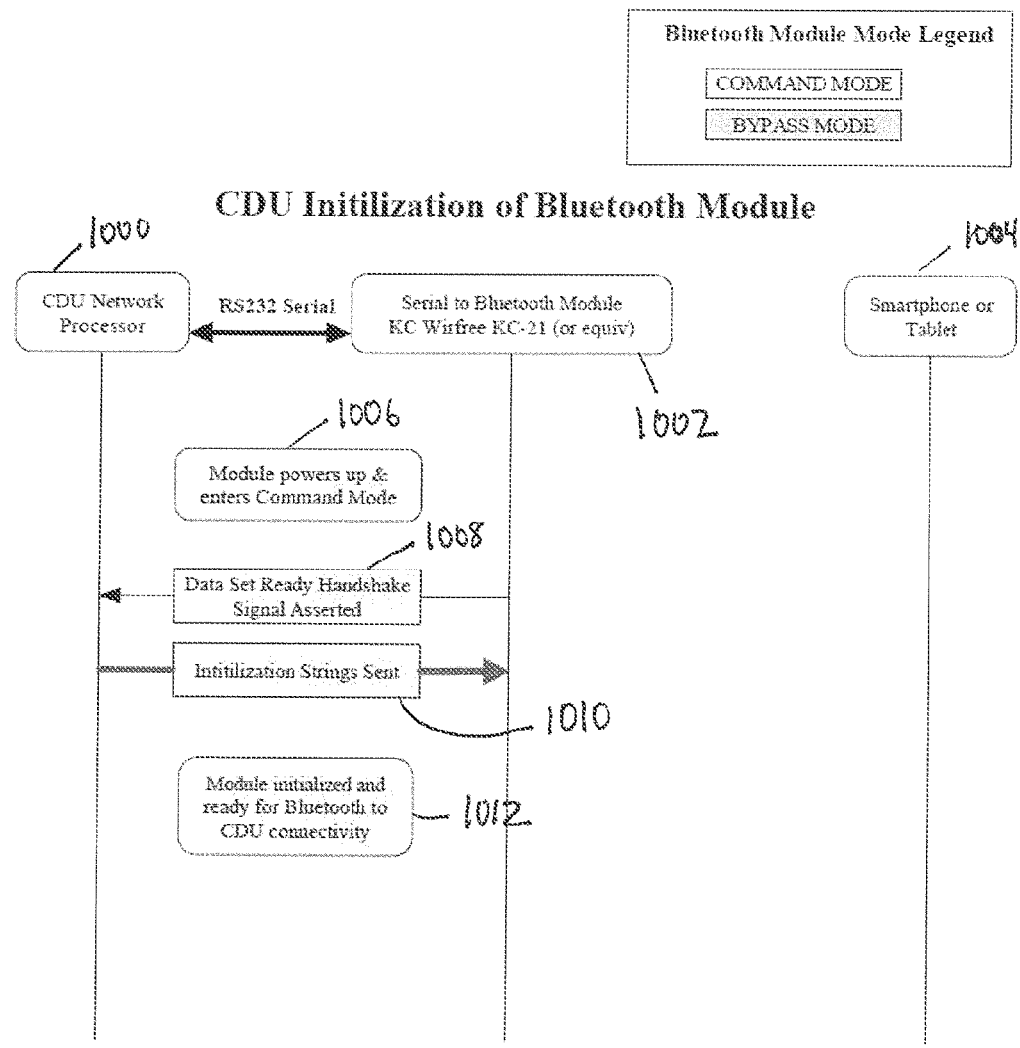
FIGS. 10A-12B are sequence diagrams showing example data flows between a user device, wireless controllers, and a power distribution unit network processor in accordance with various embodiments.

With reference now to FIG. 10A, communications between a PDU Network processor 1000, a wireless controller 1002 (e.g., serial to Bluetooth module such as, for example, KCWirefree KC 21 or equivalent), and a user device 1004 (e.g., smart phone or tablet computer) are described for various embodiments. In these embodiments, the wireless controller may be communicatively coupled with the network processor as described herein (e.g., via RS232 or any of numerous data transfer pathways may be used). The network processor may initialize the wireless controller once it recognizes that it is connected (e.g., sitting on the communications port) by issuing initialization commands. The initialization command can include various strings such as AT command strings. Two modes are shown: a command mode and a bypass mode. When the wireless controller powers up 1006 it enters a command mode. In the command mode, the wireless control may accept specific AT-prefix commands that allow the processor to perform configurations on the wireless module. AT is short for ATtention and is used to prefix all "command mode" commands. Conversely, in the bypass mode, the wireless controller acts as an RF to RS232 bridge (e.g., performing conversion of RS232 stream to RF and conversion of RF to RS232, encryption, etc.). In some embodiments, plugging in the wireless controller to the wireless interface or port of the PDU can provide voltage to the wireless controller (e.g., 5V with RS232). Additionally, once powered up (e.g., plugged into the RS232 port), the wireless controller asserts an RS232 handshake signal 1008, e.g., Data Set Ready (DSR) handshake signal, to indicate that it is ready to accept initialization commands.

In some embodiments, when the network processor receives the DSR handshake signal, the network processor then commences initialization via one or more initialization strings 1010 (e.g., AT style initialization strings). AT style initialization strings extend the structure utilized as an industry standard for modem configurations to include Bluetooth specific configurability. The initialization strings initialize the configuration of the wireless controller. Example strings can, for example, set up communication parameters on the RS232 port. Initialization parameters that may be sent during initialization include, but are not limited to, the following AT commands:
  a. At configuart 115200 none 1—Configures UART for operation at 115,200 bits per second, no parity checking, 1 stop bit
  b. At name $LOCATION—This is the name that will be provided in the Smart Device App when this module is discovered, $LOCATION is a user configurable string In some cases, default parameters may be used. These parameters may not be required to be sent. For example, several other configuration parameters that may be used but may not need to be issued include, but are not limited to, the following commands:
  a. AT Discoverable d 60—Continuous discoverability disabled, if enabled via external input discoverability is enabled for 60 seconds.
  b. AT Inputdiscoverable e 3—Enable discoverability via external input on programmable input pin 3.
  c. AT Messages d—Disable firmware notification events.
  d. AT Name servertechpdu—Set the name of the device reported when other Bluetooth devices perform discoveries to "servertechpdu".
  e. AT Outputconnect e 2 1—Enable "solid on" on programmable output pin 2 when device state is connected.
  f. AT Outputdiscoverable e 1 3—Enable "slow blink" on programmable output pin 1 while device is discoverable.
  g. AT Rfpower −25 −12—Set RF power default and max power to −25 dBm & −12 dBm
  h. AT Security 2—Enable security of the Bluetooth device to standard Once the wireless controller is initialized 1012, it is then available for discovery. Discovery is a technical process whereby a user device searches for a particular wireless controller (e.g., the Bluetooth controller) of interest. As described herein, user intervention such as pressing the "discoverability" pushbutton may still be required to enable the wireless controller to be discoverable by a user device (e.g., smartphone or tablet).

Figure 10B:
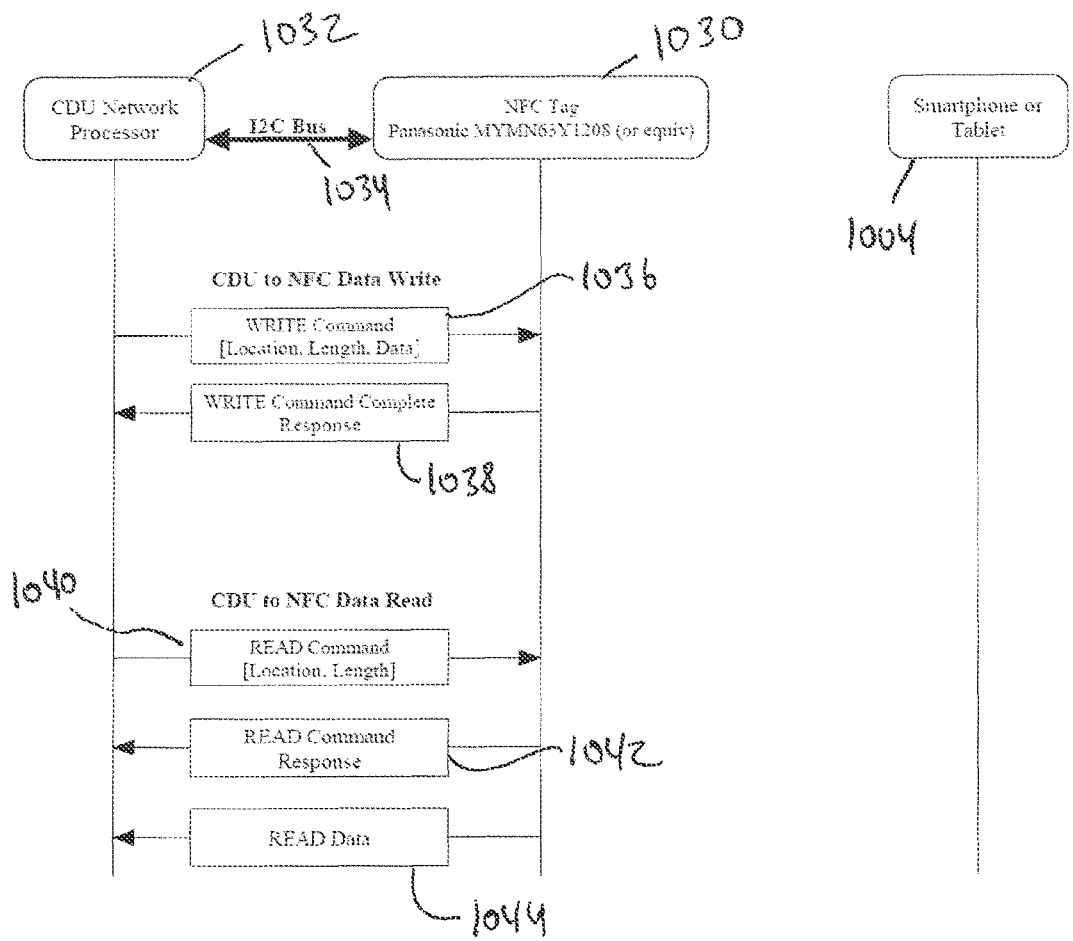

With reference now to FIG. 10B, communications between an NFC tag 1030 and a network processor 1032 are described for various embodiments. In these embodiments, the NFC tag 1030 may be coupled with the network processor 1032 via an I2C bus 1034, although it will be understood that any of numerous data transfer pathways may be used. Communications between the NFC device 1030 and network processor 1032 may allow the memory of the NFC device 1030 to be updated with various pieces of information and parameters provided by the network processor. For example, the NFC device may receive a command to write PDU identification information into the NFC memory. Additionally, in embodiments where power-related parameters are provided by a PDU, the network processor may periodically send a command to the NFC tag to write updated parameter values into the NFC tag memory, which may then be provided to an NFC enabled device. In some cases, the network processor may read data that has been written to NFC tag memory, such as updated configuration parameters, for example. When the network processor writes data to the NFC tag, indicated as "CDU to NFC Data Write" 1036 in FIG. 10A, the processor issues a write command that includes a memory location, a length or amount of data to be written, and the data to be written. The NFC tag then writes the data to the specified memory location, and sends a write command/complete response 1038 back to the network processor. When the network processor reads data from a memory of the NFC tag, indicated as "CDU to NFC Data Read", the processor issues a read command 1040 that includes a memory location, a length or amount of data to be read. The NFC tag than sends a read command response 1042 and the read data 1044 to the network processor.

Figure 11A:
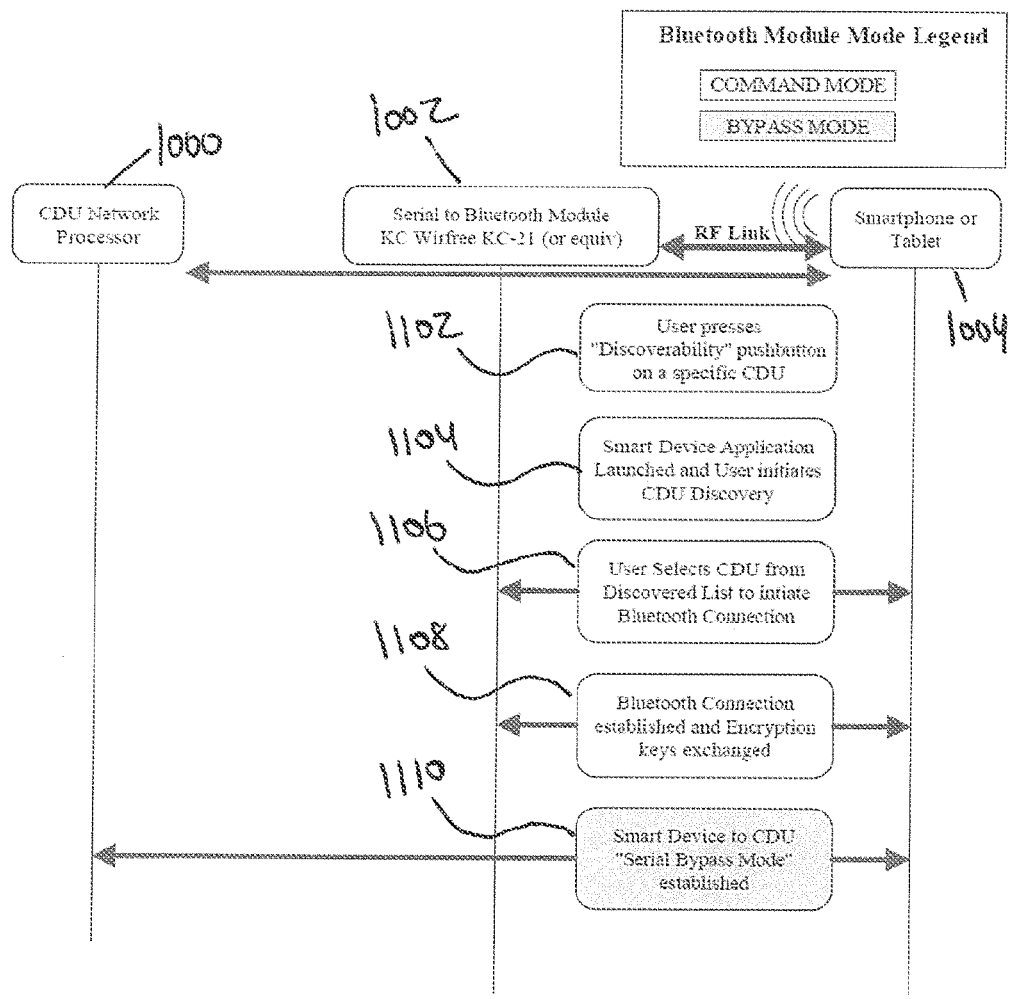

With reference now to FIG. 11A, discoverability of the wireless controller by a user device is shown. To begin, a user identifies a particular PDU with which the user wishes to connect, and presses the "discoverability" pushbutton. In the example of FIG. 11, pressing the "discoverability" pushbutton 1102 on the PDU mounted wireless controller (or the tether wireless controller in some embodiments) enables the discoverability of the wireless controller by the user device. To discover the wireless controller, the user would launch or execute a PDU application 1104 on their device. Current implementations are designed for use with Android platforms using the classic form of Bluetooth (e.g. BR/EDR). However, the disclosure could be extended to other smart devices such as those utilizing Apple iOS platform, etc. Furthermore, other forms of Bluetooth such as, low energy Bluetooth, are also possible. Apple iOS can require additional authentication. That is, the wireless controller may need an additional authentication chip. Additionally, all applications for the Apple iOS platform need to be certified by Apple. The user devices shown and described herein are only representative devices.

As discussed in greater detail with reference to FIG. 13, launching the application may cause the user device to display a discover user interface (UI) and/or automatically initiate PDU discovery. Alternatively or additionally, the discovery UI may provide a push button allowing the user to manually initiate PDU discovery. The PDU associated with the wireless controller on which the user pressed the "discoverability" pushbutton is then selectable by the user device. If the user pushed only one "discoverability" pushbutton on one wireless controller, then only that wireless controller should be displayed in a discovered list on the user device. Once the user selects the PDU 1106 from the discovered list, a wireless connection can be established 1108.

In some embodiments, during the connection, various encryption keys can be exchanged to enable encryption over the RF Link. For example, in some embodiments, a security method known as "just works" may be used with a fallback to PIN if the connecting device does not support "just works." This security method offers passive eavesdropping protection. Man in the middle (MITM) is a more expensive attack. The "just works" authentication is similar to "numeric comparison" method, but the comparison always succeeds. In some embodiments, session secret keys may be established using a variant of Diffie Hellman key exchange: Elliptic Curve Diffie Hellman. This is a symmetric key cryptography. In these examples, both devices may exchange a public key to calculate a symmetric private key for the following transactions. In some embodiments, the low energy variant of Bluetooth uses an AES cipher (with the DH key). In other embodiments, the regular variant of Bluetooth (i.e. BR/EDR) uses an E0 stream cipher.

In one embodiment, when using the KC Wirefree KC-21 module, the security mode may be a Level 2 security mode that requests pairing and accepts all requests automatically using Bluetooth v2.1 "just works" simple pairing method. This method may save pairing keys and devices in the paired list. Additionally, automatic pairing in level 2 security is considered "bonded," but not "authenticated," when automatic pairing methods are used. Furthermore, level 2 security may not be sufficient if the remote unit demands authenticated pairing (level 3 security). In such cases, the legacy Pincode pairing method used by Bluetooth v1.2 and v2.0 may be implemented. This methodology is backward compatible when requested by a legacy device. However, legacy pairing is automated, and some controllers, e.g., kcSerial can only respond with the stored Pincode. Once the Bluetooth Connection is established and the Encryption keys exchanged, the wireless controller then enters a bypass mode 1110. As discussed above, in the bypass mode, the wireless controller acts as an RF to RS232 bridge converting RS232 streams to RF and RF to RS232.

Figure 11B:
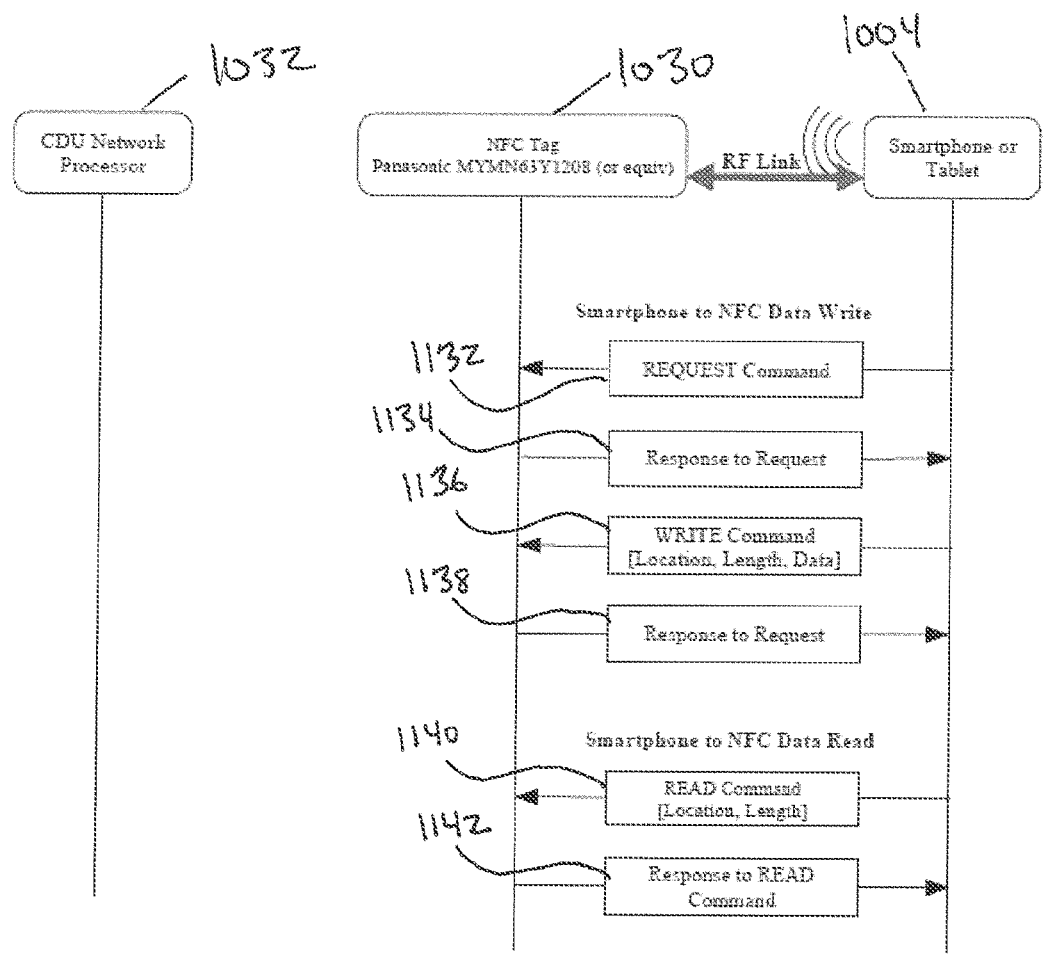

FIG. 11B describes data communications between an NFC tag 1030 and NFC-enabled device 1004 are now described for various embodiments. In cases where the NFC enabled device writes data to the NFC tag, indicated as "Smartphone to NFC Data Write" in FIG. 11B, the NFC-enabled device transmits a request command 1132 to the NFC tag. The NFC In cases where the NFC enabled device writes data to the NFC tag, indicated as "Smartphone to NFC Data Write" in FIG. 11, the NFC-enabled device transmits a request command to the NFC tag. The NFC tag then sends a response to the request 1134, acknowledging the request and indicating to the NFC-enabled device that the NFC tag is prepared to receive data. The NFC-enabled device then issues a write command 1136 that includes a memory location, a length or amount of data to be written, and the data to be written. The NFC tag then writes the data to the specified memory location, and sends a response to the request 1138 back to the NFC-enabled device. When the NFC-enabled device reads data from the memory of the NFC tag, indicated as "Smartphone to NFC Data Read" in FIG. 11A, the NFC-enabled device issues a read command 1140 that includes a memory location, a length or amount of data to be read. The NFC tag than sends a read command response 1142 and the read data to the NFC-enabled device.

Figure 12A:
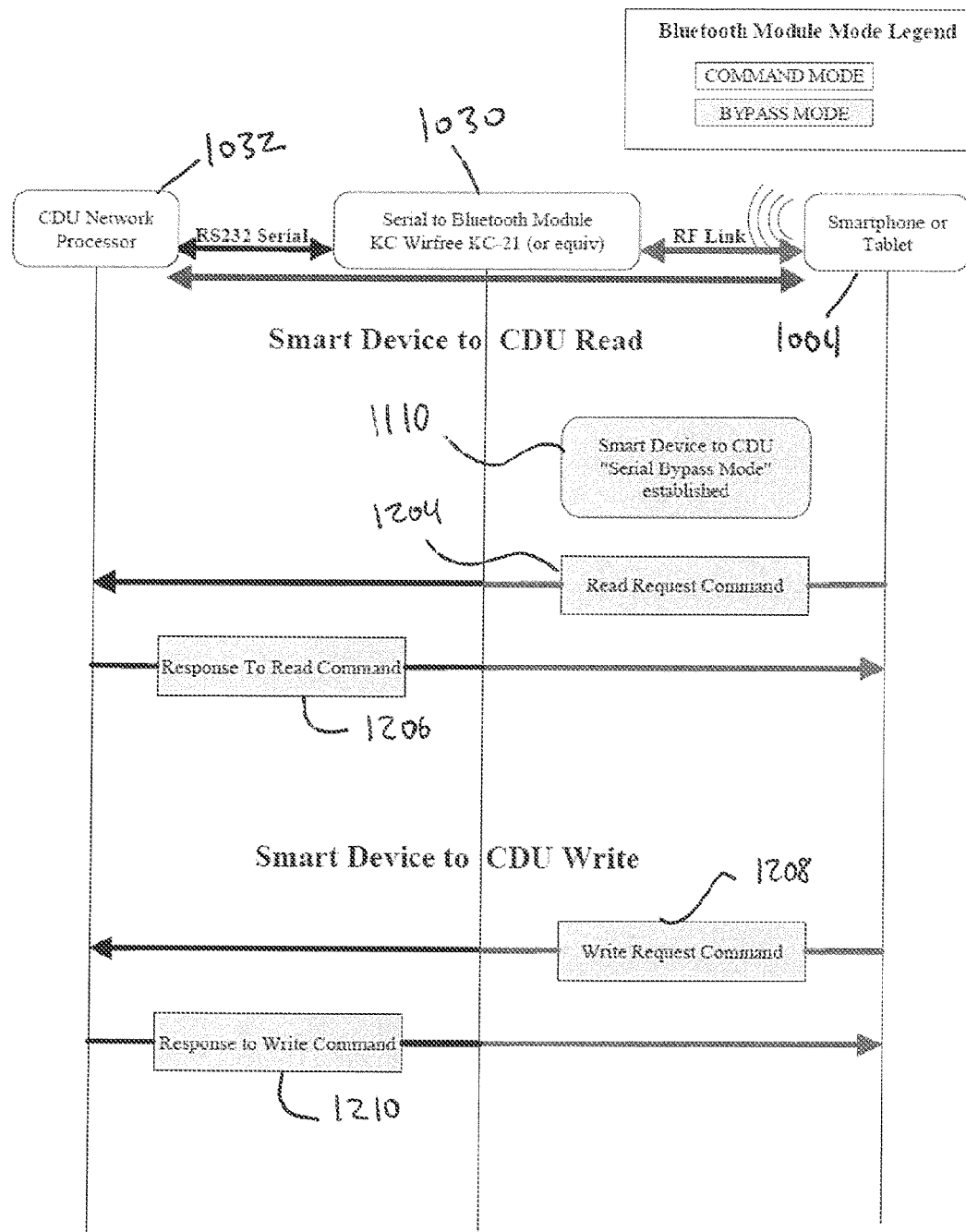

In FIG. 12A, communication of serial command protocol (SCP) commands and responses between the user device 1004 and the network processor 1032 are illustrated. As discussed above, the various steps required for the wireless controller to enter the serial bypass mode 1110 are first performed. Once in bypass mode, as shown, the user device can issue read commands 1204 to the network processor and responsively receive responses 1206 to those reads including read data. Likewise, the user device can issue write commands 1208 to the network processor and responsively receive confirmation 1210 that a write completed successfully. Although not shown, in some embodiments, a network processor may also initiate read and/or write commands. In some embodiments, a read command may include a memory location and a length or amount of data to be read. Similarly, a write command may include a memory location and data to be written. Additionally, during the bypass mode, among other responsibilities, the wireless controller may perform the necessary RF encryption and decryption. In some embodiments, a proprietary serial command protocol, such as the Sentry Serial command Protocol Session Control Specification, Rev. 2.0h (or later), available from Server Technology, Inc. of Reno Nev. may be utilized for communications between the user device and the network processor. However, other proprietary or non-proprietary serial command protocols may be utilized, including combinations and/or variations thereof. Several example read and write commands from the Sentry Serial Command Protocol Session Control Specification are shown below.

An example Infeed Status READ Command:
Infeed Status READ Command
    ISTAT—Input Feed (Inlet) Status
    Returns the status of all available power input cords.
    Status includes:
    Identification
    Status (On/Off/Error),
    Infeed Current (amps)
    Query Command:
    !*QISTAT,{<system name>|<assigned name>|ALL}<CR>
    Response:
    "["<system name>,<dstat>,<load>"]"<CR><LF>
    Example:
    To get the status of input feed .AA—
    Send:
    !*QISTAT,.AA<CR>
    Receive:
    [.AA,On,1.25 Amps]<CR><LF>
    ~<CR><LF>

An example PDU Location WRITE Command:
PDU Location WRITE Command
    LOCATION—System Location
    Configure the user settable PDU Location string to uniquely identify the PDU's location within the corporate infrastructure.
    Maximum string length is 32 characters.
    Write Command:
    !*WLOCATION,.@,<value><CR>
    Response:
    "[".@,{+|−}"]"<CR><LF>
    The maximum location string length is 32 characters.
    Examples:
    To set the system location string—
    Send:
    !*WLOCATION,.@,Reno, Nev.<CR>
    Receive:
    [.@,+]<CR><LF>
    ~<CR><LF>
    Note:
    The comma (",") in "Reno, Nev." is part of the stored location string.
    Other example commands:
PDU IPV4 Network Configuration READ Command
    Internet Protocol Version 4 Configuration
    Returns the IPV4 network address, subnet mask, and gateway address
    IPV4 address: IP address returned in dotted-decimal notation
    Subnet Mask: Network to host addressing mask Gateway: Network address access point
Query Command:
!*QNETV4,.@<CR>
Response:
"["<system name>,<ipv4 address>,<ipv4 mask>,<ipv4 gateway>"]"<CR><LF>
Example:
To get the IPV4 configuration settings—
Send:
!*QNETV4,.@<CR>
Receive:
"[".@,192.168.2.202,    255.255.255.0,192.168.2.1"]"<CR><LF>
~<CR><LF>

PDU Network Status READ Command
Ethernet Port Status
Returns the status of the 10/100 base-T Ethernet network port including:
Network Status: Static/Dynamic IPV4/IPV6
Link Status: Up/Down
Link Negotiation: 10/100/Auto
Duplex: Half/Full
Query Command:
!*QNETSTAT,.@<CR>
Response:
"["<system name>,<network status>,<link status>,<negotiation>,<speed>,<duplex>"]"<CR><LF>
Example:
To get the Ethernet Network status—
Send:
!*QNETSTAT,.@<CR>
Receive:
"[".@,Static IPv4,Up,Auto,100 Mbps,Full"]"<CR><LF>
~<CR><LF>

PDU Uptime READ Command
CDU runtime since power applied
Returns the current runtime since CDU was last started
Query Command:
!*QUPTIME,.@<CR>
Example:
To get the current CDU runtime—
Send:
!*UPTIME,.@<CR>
Receive:
"[".@,0 days 0 hours 17 minutes 36 seconds"]"<CR><LF>
~<CR><LF>

Other SCP commands are also possible for requesting a variety of information. For example, SCP Commands can include, but are not limited to session control commands (e.g., authentication, end-session (exit), and restart w/ options reset to factory default settings), power control, status, and temporary outlet grouping commands (e.g., Change Outlet Control State, Enclosure (Tower) Status, Input Feed (Inlet) Status, Input Feed (Inlet) Status Extended, Individual Input Feed (Inlet) Status, Outlet Status, Outlet Status Extended, Individual Outlet Status, Group Clear, and Group Add Outlet), environmental monitor status commands (e.g., Environmental Monitor Status, Water Sensor Status, Analog to Digital Converter Status, Temperature/Humidity Probe Status, and Contact Closure Alarm Status), Configuration Settings, Names, & Outlet Wakeup states, etc. commands (e.g., Number of Power Enclosures, Number of Environmental Monitors, NVM Reset Button Control, Cold Boot Alert, Outlet Reboot Delay. Outlet Sequencing Interval, Serial Port Parameters, Command Line Interface Session Control, Serial Command Protocol Session Control, Authentication, OEM Information String, System Location, SCP Revision, Firmware Version, Temperature Scale Control, System Area (in Sq. System Units), Units for System Area (Sq. Feet or Meters), and System Power Factor), power enclosure commands (e.g., Number of Input Feeds in Enclosure, Input Feed Capabilities, Input Feed Maximum Load, Number of Outlets on Input Feed, Outlet Capabilities, Outlet Maximum Load, Tower Capabilities, Tower Model Number, Tower Product Serial Number, Assigned Power Object Names, Post Outlet On Delay, Outlet Wakeup State), environmental monitor commands (e.g., Environmental Monitor Capabilities, Assigned Monitor Names), and system status commands (e.g., System Draw in Watts, System Power Density in Watts, Phase System Balance). Additional commands are also possible.

Figure 12B:
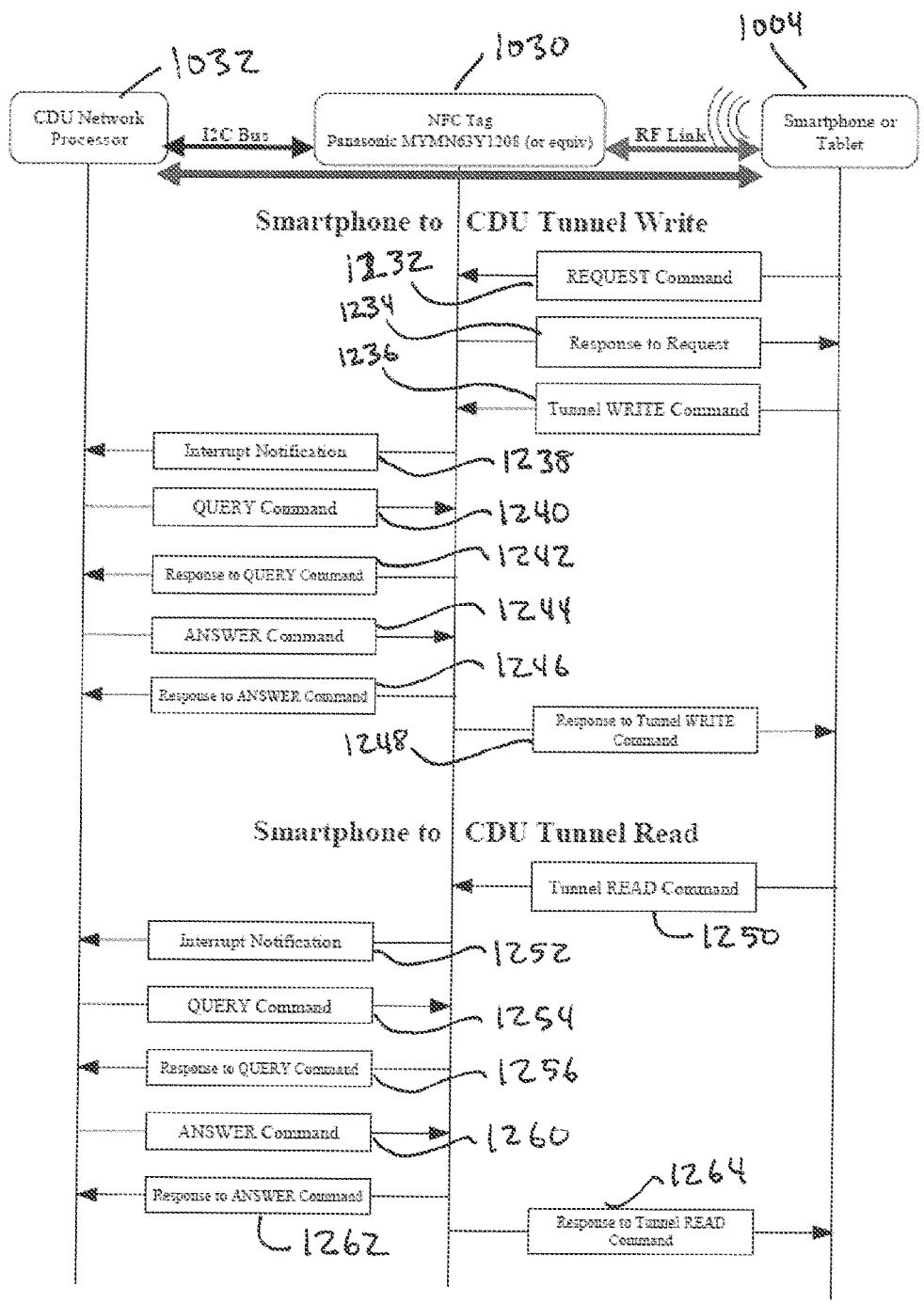

FIG. 12B illustrates a process for NFC devices to interface between an NFC-enabled device 1004 and a network processor 1032. For example, an NFC tag may allow an NFC-enabled device to tunnel through the NFC tag to access a serial bus that is coupled with the NFC tag. FIG. 12B, illustrates tunneling operations that may be performed according to various embodiments. In cases where an NFC-enabled device wishes to communicate directly with a network processor and exchange information, the tunnel mode may be used. This is indicated as "Smartphone to CDU Tunnel Write" in FIG. 12B. This procedure is initiated with a request command 1232 from the NFC-enabled device to the NFC tag. The NFC tag then sends a response to the request 1234, acknowledging the request and indicating to the NFC-enabled device that the NFC tag is prepared to receive a command. The NFC-enabled device then sends a tunnel write command 1236 to the NFC tag. The NFC tag then sends an interrupt notification 1238 to the network processor via a separate I/O pin on the network processor, indicating to the network processor that access to the network processor via the NFC tunnel is requested. The network processor then sends a query command 1240 to the NFC tag, and the NFC tag may respond to the query request with information 1242, such as a command or data, received from the NFC-enabled device. The network processor then answers the command 1244, and the NFC tag sends an acknowledgment response 1246 to the answer command to the network processor. The NFC tag then forwards the response 1248 to the tunnel write command to the NFC-enabled device.

In cases where an NFC-enabled device wishes to communicate directly with the network processor and read data from the network processor, a tunnel read may be initiated. This is indicated as "Smartphone to CDU Tunnel Read" in FIG. 12B. This procedure is initiated with a tunnel read command 1250 from the NFC-enabled device to the NFC tag. The 20 NFC tag then sends an interrupt notification 1252 to the network processor via a separate I/O pin on the network processor, indicating to the network processor that access to the network processor via the NFC tunnel is requested. The network processor then sends a query command 1254 to the NFC tag, and the NFC tag sends a response 1256 to the query request with information received from the NFC-enabled device related to the data to be read. The network processor then answers the command 1260 with the requested data, and the NFC tag sends an acknowledgment 1262 to the answer command to the network processor. The NFC tag then forwards this response 1264 to the tunnel read command to the NFC-enabled device, which may include data that is read from the network processor. In such a manner, information may be transferred between the network processor and NFC-enabled device.

According to some embodiments, an application running on the NFC enabled device may use tunneling to access functions of the PDU, such as configuration functions and other commands that would normally require a user to log into the PDU through a central power manager or through a direct serial port or Ethernet port connection within a PDU.

While the embodiments of FIGS. 10-12 are discussed in relation to and/or a serial to Bluetooth module and an NFC tag, it will be understood that other radio access technologies may employ similar procedures to transfer data between a user device and a PDU, and to access a network processor of the PDU from a user device.

Figure 13:
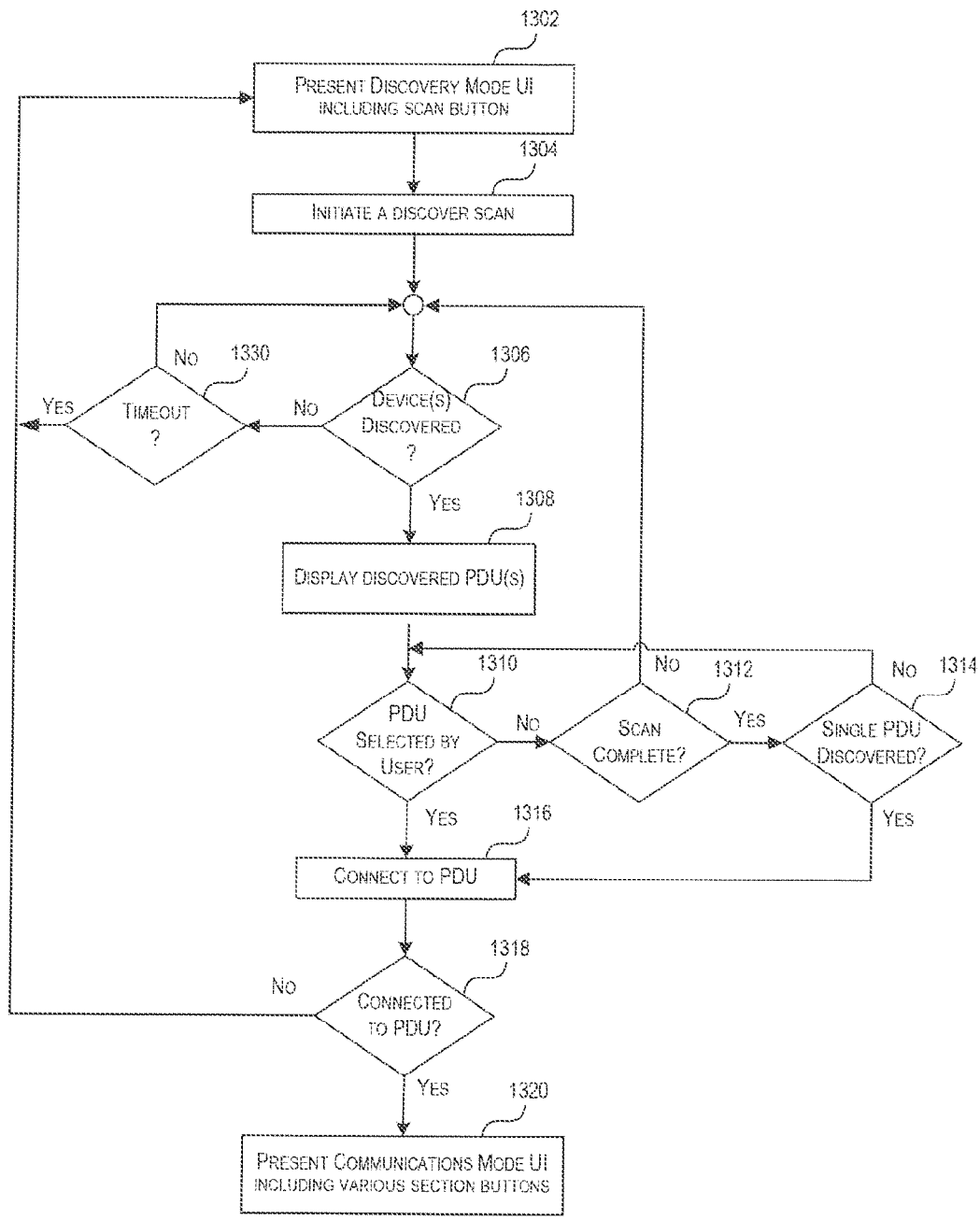
FIG. 13 shows a flow diagram illustrating example operations of a user device for establishing a connection and exchanging communications with a power distribution network processor and a user in accordance with various embodiments.

FIG. 13 shows a flow diagram illustrating example operation of a wireless-enabled user device for establishing a connection and exchanging communications with a power distribution network processor and a user in accordance with various embodiments. In particular, the user device of the example of FIG. 13 is Bluetooth-enabled or NFC enabled. A user device and/or a device application (software app) executing on a user device (e.g., smartphone or tablet) can individually, or in combination, perform the transactions. The diagram of FIG. 13 is generally self-explanatory based on the above detailed description, but some details will now be provided.

To begin, after pressing a "discoverability" pushbutton on a wireless controller associated with a specific PDU, a user executes an application on a user device. At step 1302, the device application presents to a user a discover mode user interface (UI) including a scan button. At step 1304, the application initiates a scan. The scan may initiate if, for example, a user selects the scan button (e.g., via a touch screen on the user device) to initiate a scan from the discovery mode UI. Alternatively or additionally, upon starting the application, a scan may automatically initiate. At decision step 1306, the application determines if one or more wireless devices (e.g., wireless controllers) are discovered. If not, at decision step 1330, the application determines whether a timeout has occurred. If so, the application presents the Discovery Mode screen (1302). Otherwise, the application continues to search for devices. If/when devices are discovered, at step 1308, the application displays the discovered PDU device(s). That is, in some embodiments, the application can filter any non-PDU wireless devices that are discovered and display only the PDU devices to the user via a user interface. In some embodiments, the listed PDUs are discovered Bluetooth-enabled PDs that can be displayed as key-value-pairs. That is, for each PDU, the name of the PDU and its signal strength; RSSI, may be presented to the user as a pair. However, just a PDU name and/or MAC address (of associated Bluetooth controller) may be presented. A UI illustrating a discovered device list is shown and discussed in greater detail with respect to FIG. 14. At decision step 1310, the application determines if a displayed PDU is selected. If not, at decision step 1312, the application determines if the scan of devices is complete. If not, the application continues to scan. Otherwise, at decision step 1314, the application determines if a single PDU is found. If so, or if a PDU is selected in step 1310, the application initiates a connection with the PDU as discussed in FIG. 11. At decision step 1318, the application determines if the connection is established/successful. If so, the application electronically presents a summary or communications mode UI including various buttons to the user (e.g., see FIG. 15). The summary or communications mode UI can include various section tabs. For example, as shown in FIG. 15, a title bar including a "System" tab, an "Infeeds" tab, and an "Outlets" tab is shown. In some embodiments, a title bar is a user interface device that appears as a horizontal bar spanning a larger interface. Title bars typically contain menus, links, data, etc., specific to the currently visible information in the rest of the interface.

As discussed above, after connecting to a PDU (i.e., Bluetooth wireless controller associated with PDU), the interface may change to the summary mode broken up into sections. The title bar may contain a tab for each section that the user can select for navigation. The tabs may contain the section title. The title bar tab for the selected section may be visibly inactive. Clicking the back button from this screen may disconnect the user from the product and return them to the discovery mode UI. Furthermore, in one or more embodiments, a user can disconnect and/or otherwise exit application from any UI or mode.

According to a user's preference, the following listed information may appear in one of three forms: a table, a key-value-pair, or an expandable list. Only key-value-pairs will be hidden in expandable list. Below is a representative application structure for the summary mode UI, by section, and the various items that may be displayed under each section:

A. System—Mostly a catch all for non-power information
  I. IPV4 Address
    Type: key-value-pair
  II. IPV6 Address
    Type: key-value-pair
  *III. Network *
    *Type: Expandable List *
    *Header: Network *
    *Contents: *
      a. IPV4 Address
      *b. IPV4 DHCP *
      *c. IPV4 subnet mask *
      *d. IPv4 gateway *
      e. IPV6 Address
      *f. IPV6 Gateway *
      *g. DNS1 *
      *h. DNS2 *
      *i. Fully qualified domain name *
      *j. Boot Delay *
      *k. Static Fallback *
      *l. Link Status *
      *m. Link Speed *
      *n. Link Duplex *
      *o. Link Negotiation *
      *p. Telnet enabled, Telnet port *
      *q. SSH enabled, SSH port *
      *r. HTTP enabled, HTTP port *
      *s. HTTPS enabled, HTTPS port *
      *t. SNMP enabled, SNMP port, SNMP Versions, trap ports*
      *u. FTP enabled, FTP port *
  IV. Uptime
    Type: key-value-pair
  V. Temperature $THSID (One for each THS)
    Type: key-value-pair
  VI. Humidity $THSID (One for each THS)
    Type: key-value-pair
  VII. Firmware Version
    Type: key-value-pair
  *VIII. Firmware *
    *Type: Expandable List *
    *Header: $TYPE Sentry $VERSION *
    *Contents: *
      a. Version
      b. Type c. Build *
   d. Beta *
   e. MAC Address *
   f. Flash Size *
   g. Hardware Rev Code *
IX. Model Number
   Type: key-value-pair
X. Product Serial Number
   Type: key-value-pair
*XI. About *
   *Type: Expandable List *
   *Header: Tower $TOWERID (one for each tower) *
   *Contents: *
      a. Product Serial Number
      *b. NIC Serial Number *
      c. Model Number
      *d. Location *
      *e. Power Type (AC/DC) *
      *f Phases (3 or 2/1) *
      *g. Voltage *
      *h. Load Max *
XII. Bluetooth Device Name
   Type: key-value-pair
B. Infeeds (Default tab)
1. Lines
   Type: Table
   Rows: For each unique line
   Columns:
      *0. ID *
      a. Current
      b. status
      c. Capacity
      d. Capacity Used
      e. Voltage
      f. Wattage
II. Phases
   Type: Table
   Rows: For each unique Phase Pair
   Columns:
      *0. ID *
      a. Current
      b. Voltage
      c. Wattage/Active Power
      *d. VA/Apparent Power *
      e. Energy
      *f VAR/Reactive Power *
      *g. Power Factor *
      *h. Reactance/Load Type *
      *i. Crest Factor *
III. Circuit/Tower
   Type: Table
   Rows: For each Tower/Circuit
   Columns:
      *0. ID *
      a. Current
      b. Voltage
      *c. capacity *
      d. Wattage/Active Power
      *e. VA/Apparent Power *
      f. Energy
      *g. Power Factor *
      *h. Frequency *
C. Outlets
I. Outlets
   Type: Table
   Rows: For Each Outlet
   Columns:
      *0. ID *
      a. Name
      b. Current
      c. status
      d. Voltage
      e. current capacity
      f. Wattage/Active Power
      *g. VA/Apparent Power *
      h. Energy
      *i. VAR/Reactive Power *
      *j. Power Factor *
      *k. Load Type *
      *l. Crest Factor *
* Everything in the above list is currently available and/or can otherwise be provided by current PDUs; however, items listed with * may not currently be implemented.

In some embodiments, if a warning or error limit is exceeded or a circuit is de-energized (breakered or fused), a message may be displayed between the title bar and the list. The error message may be in a contrasting color to the rest of the display. Only the most critical error may be displayed. The user may select the error message which may cause one of two things to occur:

A. If there is only one error in the system: the user is moved to the detail screen that contains the attribute that is in error.

B. If there is more than one error: the user is moved to a list of system errors, where selecting one error will take the user to the detail screen as described in 6.A. The title bar in this screen will be similar to the detail presentation. The back button will return the user to the screen they were at prior to selecting the error message.

In some embodiments, attributes that are causing errors may be displayed in a contrasting color wherever they appear (e.g., Red/Orange). In some embodiments, attributes that are causing warnings will be displayed in a contrasting color, different from the errors, wherever they appear (e.g., Yellow). In some embodiments, if the user selects the menu button, the application will present a menu: A. Close—causes the application to close; B. About—Displays information about the android application to the user in a pop-up. In some embodiments, information should include the application name, link to application in google play store or similar, current version, and copyright information.

In some embodiments, the Application uses Key-Value-Pair data format where a value is stored or associated with its title or descriptions. In some embodiments, the Application can utilize table UI. A table is a user interface device that collects similar data into a two dimensional array. The first row of a table contains the description or title of the values in subsequent rows. Each row is a unique group of related data. The first column of a table typically contains a unique title or name for each row. If the tabular data is too large to display on screen at once, the user may scroll through it by dragging their figure across the list in either axis. In some embodiments, the Application can utilize expandable lists. An expandable list is a user interface device that functions in two modes. In the first mode it presents a header and an icon to identify the mode. The header typically is a title and possibly a small amount of data. If the user selects the expandable list, additional data appears below the header and the icon changes to identify the expansion of the list. If the user selects the expandable list again, it returns to the first mode. Data that only appears in the expansion is indented in from the header and typically a smaller font.

FIGS. 14-17 show example user interfaces for presentation to a user in accordance with various embodiments. In the examples of FIGS. 14-17, screenshots from a single-phase per-input power sensing (PIPS) and per-output power sensing (POPS) Switched PDU utilizing the Bluetooth Module, SCP protocol over RS-232, and STI developed Smart Device Application for Android are shown. The screenshots can also apply to NFC communications. The user interfaces of FIGS. 14-17 are generally self-explanatory based on the above detailed description, but some details will now be provided.

Figure 14:
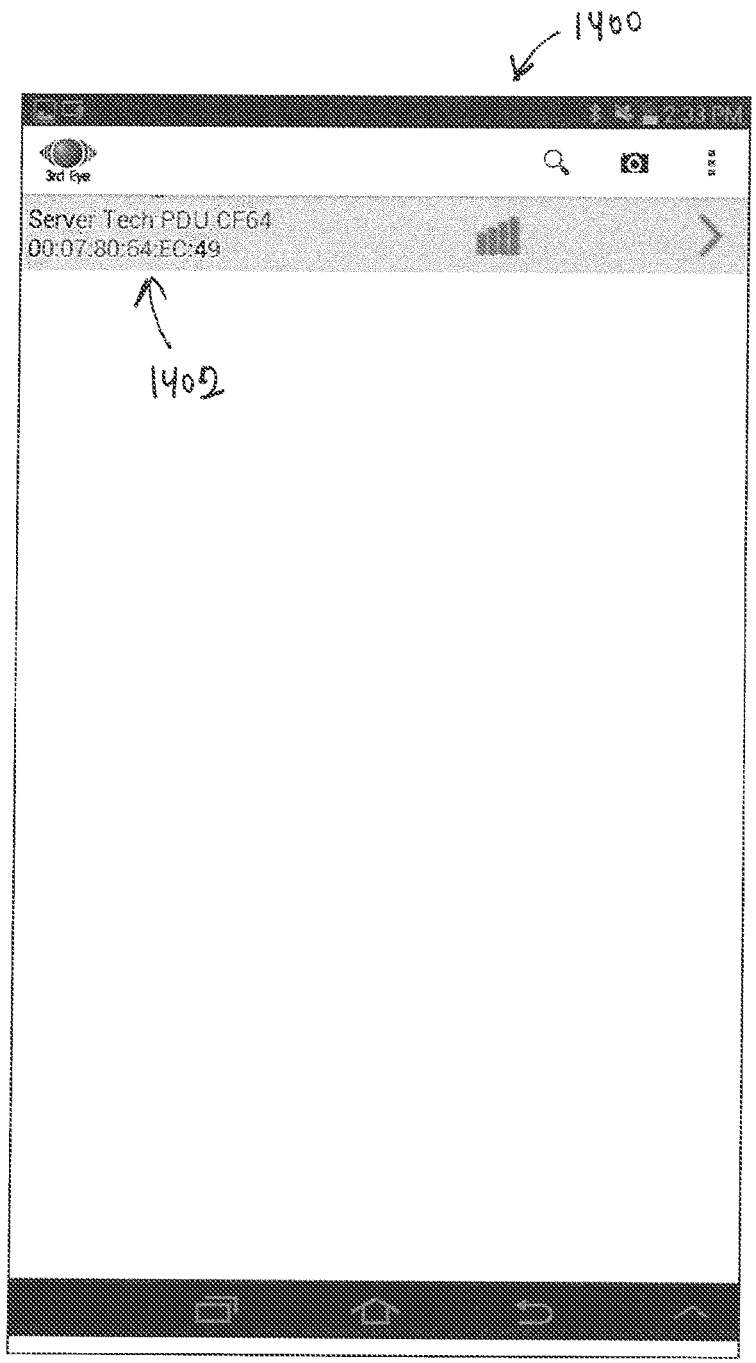
Figure 15:
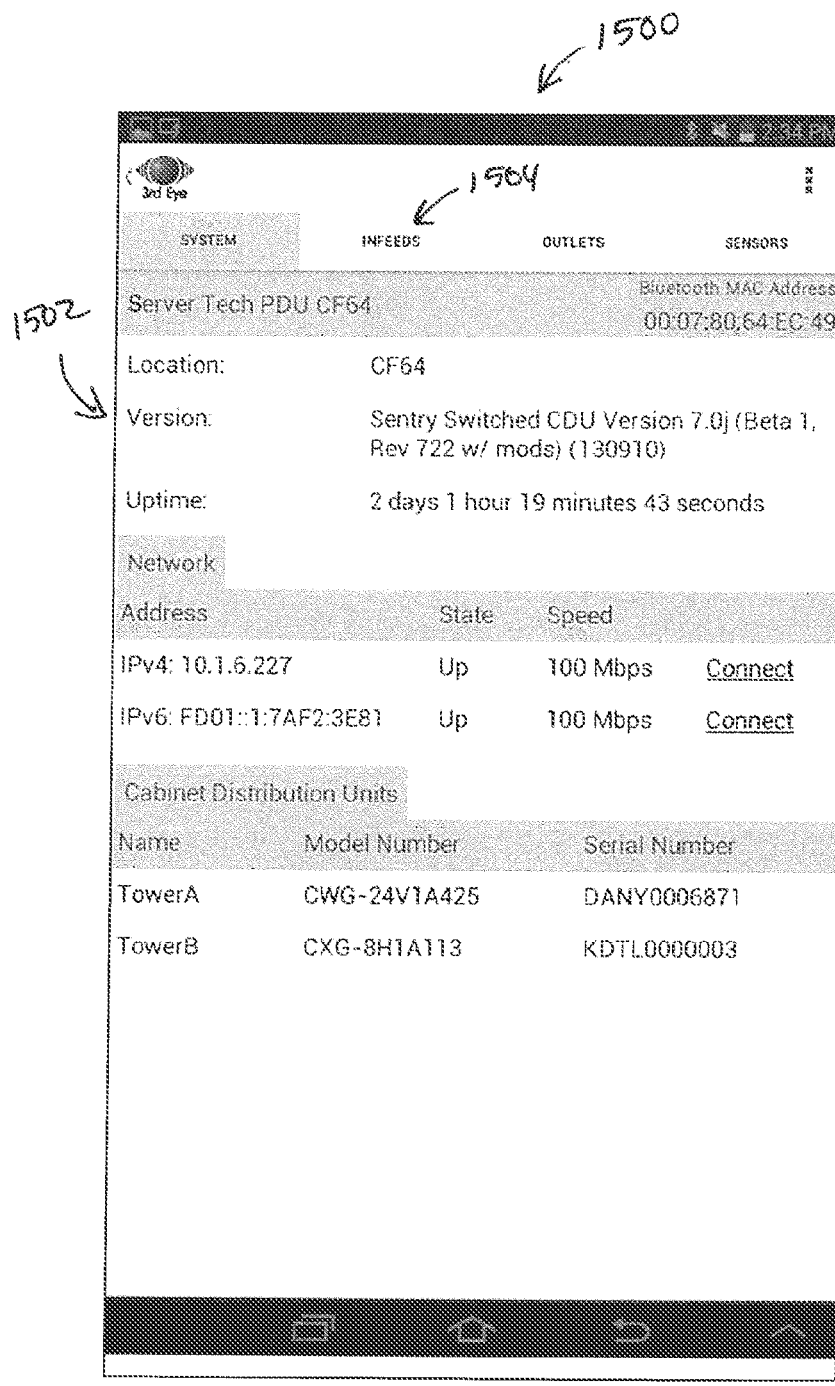

With reference now to FIG. 14, a user device (e.g., Smart Device) application screen capture 1400 is shown that presents a list of Bluetooth devices or NFC devices (e.g., wireless controllers) discovered via the Application's scanning mode. A PDU name and MAC address 1402 of the associated wireless controller are shown. Additionally, a refresh button is shown in the top right corner and a summary of results "Scan finished. 1 devices were found" is also shown.

FIG. 15 is a user device (e.g., Smart Device) application screen capture 1500 that shows PDU System information 1502 transferred from the PDU to the Smart Device via Bluetooth/RS-232/SCP. The information shown includes the system version, model, serial number, IPv4 address, uptime, and sensors. The UI is scrollable, only the temp/humidity sensor information for the first of two sensors is shown. Additional sensor detail may also be shown in addition to various other system information. By way of example and not limitation, the following information may be shown:

Push Product Configuration or Setup information;
On/Off/Rebooting of outlets;
Firmware upgrades;
Configuration of outlet names, PDU names, etc.
Stream connectivity for other wireless devices, such as Wi-Fi or Bluetooth, from this device
Ability to text or email this PDU-related information.

Figure 16:
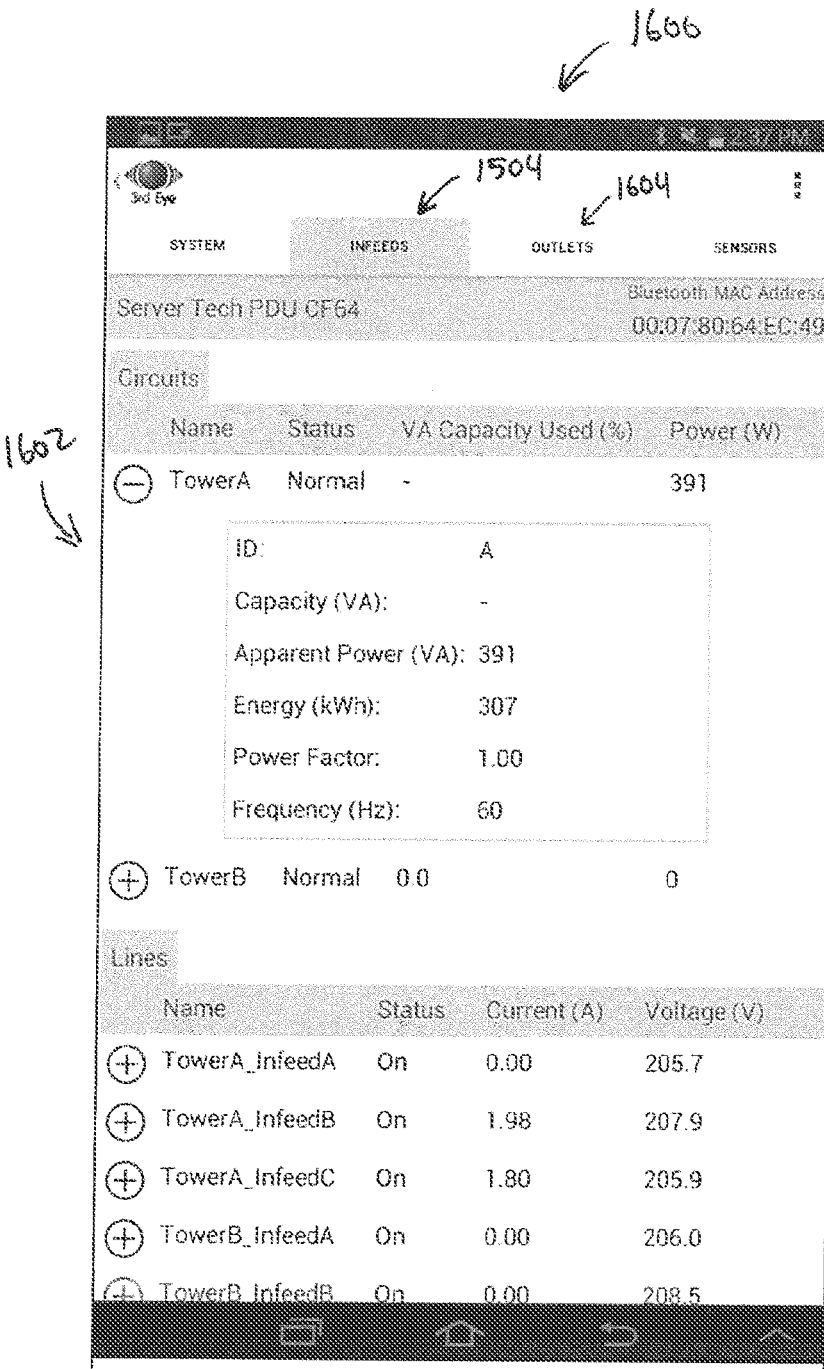
Figure 17:
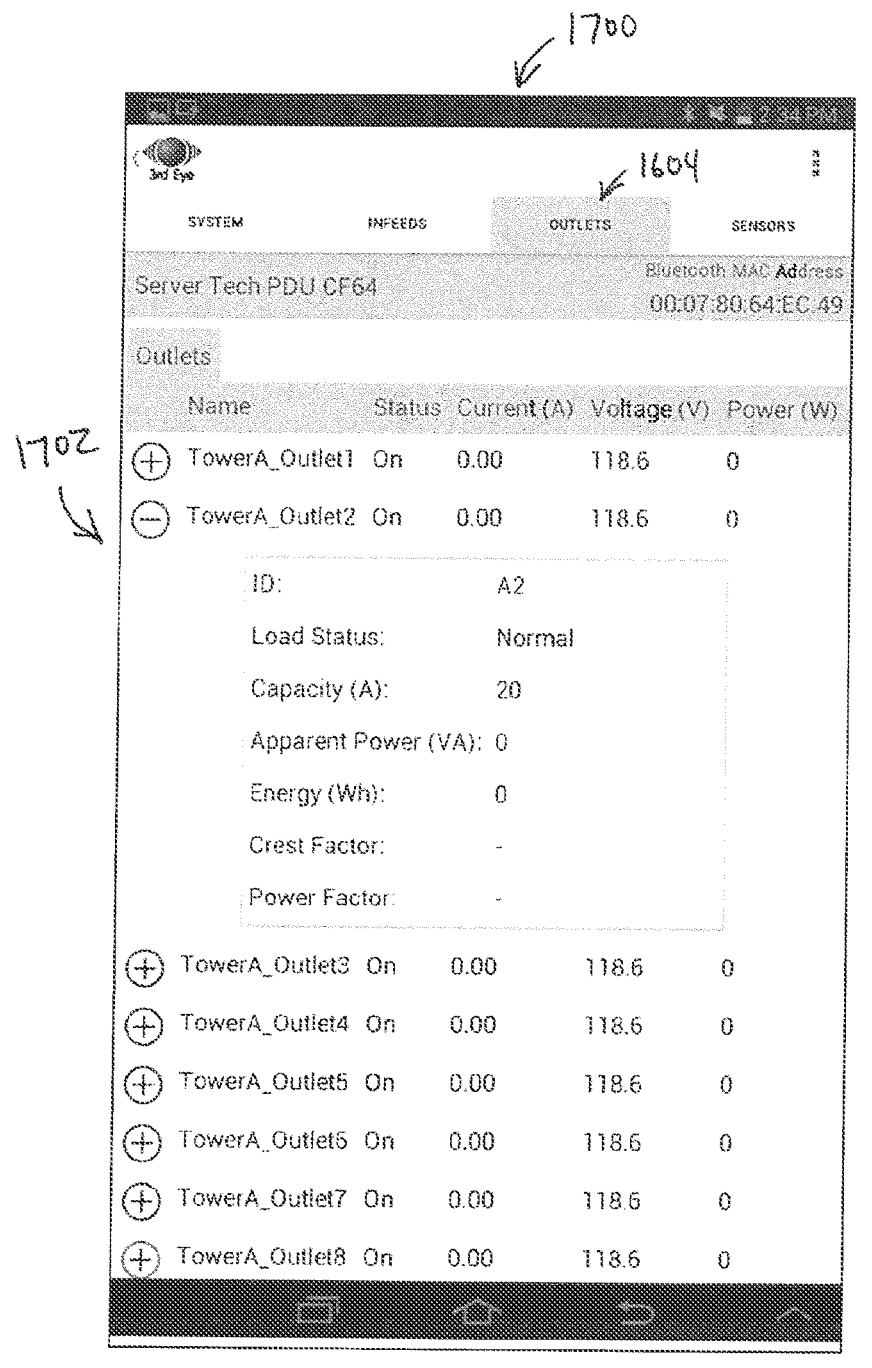

If a user selects the "Infeeds" tab 1504 from the title bar, FIG. 16 is shown. FIG. 16 illustrates a user device (e.g., Smart Device) application screen capture 1600 that shows PDU Infeed information 1602 transferred from the PDU to the Smart Device via Bluetooth/RS-232/SCP. Similarly, if the user selects the "Outlets" tab 1604 from the title bar, FIG. 17 is shown. FIG. 17 illustrates a user device (e.g., Smart Device) application screen capture 1700 that shows PDU POPS Outlet information 1702 transferred from the PDU to the Smart Device via Bluetooth/RS-232/SCP.

Figure 18:
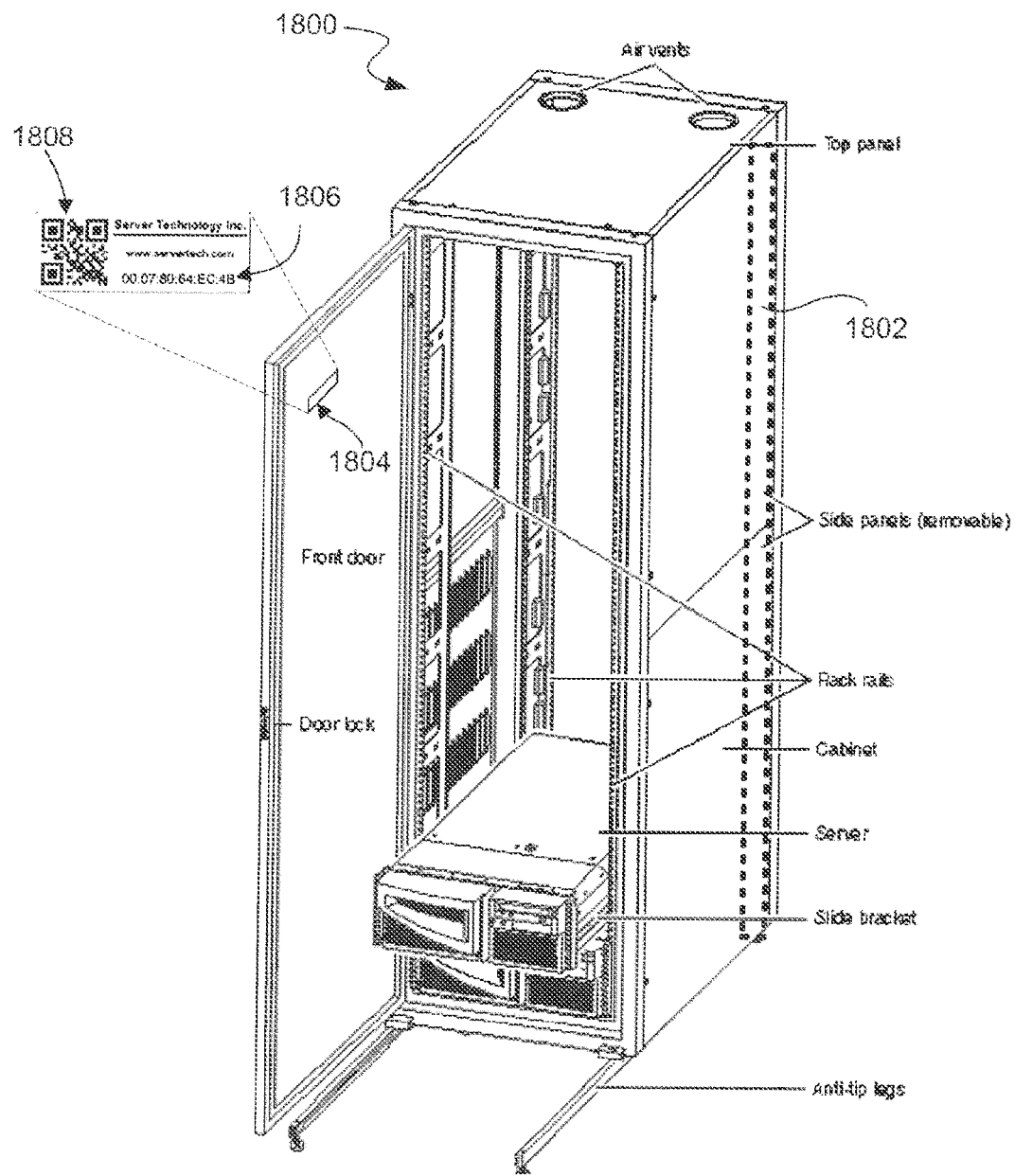
FIG. 18 illustrates a diagram of a hardware identifier affixed to an electronic equipment cabinet in accordance with various embodiments.

FIG. 18 illustrates a diagram of an electronic equipment cabinet 1800, in accordance with an embodiment of the disclosure. The equipment cabinet 1800 is configured to facilitate establishing wireless connections between a PDU and a user device. As illustrated, the equipment cabinet 1800 may include various components such as air vents, panels, rack rails, brackets, electronic appliances, and more. The electronic equipment cabinet 1800 may also include a CDU 1802 (i.e., a cabinet PDU), and a hardware identifier 1804. According to various embodiments, the CDU 1802 can include the features of one or more of the CDUs fully or partially illustrated in FIGS. 1-4. The hardware identifier 1804 can optically or wirelessly provide information to an

| Item | Notes |
|---|---|
| IP Address | Both an IPv4 and an IPv6 address if the product is dual stack. |
| Uptime | Duration that PDU has been operational since it was last started. |
| Serial Number(s) | PDU serial number for Master enclosure and optional Link enclosure |
| FW Version | PDU Application firmware version installed |
| Model Numbers | PDU model number for Master and optional Link enclosure |
| Temperature and Humidity Information | Environmental temperature and humidity information from up to 2 combination sensors for each Master and optional Link enclosure.. |
| OCPD Failure | PDU branch fuse or circuit breaker status. |
| PIPS | Power Metrics for PDU input power cord(s) (e.g. voltage, current, apparent power, active power, accumulated energy, etc.) |
| POPS | Power Metrics for PDU output receptacle(s) (e.g. voltage, current, apparent power, active power, accumulated energy, etc.) |
| Current Display(s) | Reproduce the LED current load displays that are on the front of the current PDU's. |
| Outlet Status | For Switched products show the outlet status and control state |

Additional System Capabilities that could be Supported May Include:
  Support both type of communication types that NFT supports;
  Allow the smart device's application to ping the PDU's IP and launch a web browser via a button or choice within the smart device application;
  Multiple screens (UI) design with PIPS and POPS information having their own screens on the application;
  If there is dynamic information that needs to be refreshed then it is acceptable to have a LOAD or Update button that is required to be touched before information is downloaded via the application;
  Requiring a user must use a login and password to download information or employ some other appropriate mechanism to ensure that information is not downloaded by unauthorized personnel running the application;

electronic user device to enable rapid, secure, and/or confident communication with the CDU 1802.

In accordance with various embodiments of the disclosure, the hardware identifier 1804 can be disposed on various portions of the electronic equipment cabinet 1800 to conveniently and comfortably allow a user to establish a wireless connection with the CDU 1802. A data center will typically include a number of equipment racks or equipment cabinets organized in rows on the floor of the data center. The rows are oriented around cold aisles (air intake for the cabinets) and hot aisles (air exhaust for the cabinets). In particular, equipment cabinets are regularly disposed on either side of a cold aisle such that the front doors of one row of equipment cabinets face the front doors of another row of equipment cabinets. Furthermore, equipment cabinets are disposed on either side of a hot aisle such that the rear portions of two rows of equipment cabinets are oriented towards one another. Presently, there are times when a technician or other user is required to work within the hot aisle in order to gather information or establish connections to PDUs, such as CDU 1802. An advantage of the hardware identifier 1804 is that it can be implemented as an adhesive label or tag that can be affixed to various locations on the equipment cabinet 1800, such as on a front door, a side panel, a rack rail, a side bracket, or the like. When disposed any one or more of these locations, the hardware identifier 1804 enables a technician or other user to work while standing in the cold aisle while establishing a wireless connection to the CDU 1802.

In accordance with various embodiments of the disclosure, the hardware identifier 1804 can be implemented using various techniques. According to one embodiment, the hardware identifier 1804 is configured to provide optical information to a user device. For example, the hardware identifier 1804 can include text 1806 and/or a barcode 1808 that identifies information for enabling a user device to connect wirelessly with the CDU 1802. The text 1806 can include a media access control (MAC) address of a Bluetooth chip, card, or module that is integrated within or connected to the CDU 1802. The barcode 1808 can be a one-dimensional or two-dimensional barcode that similarly can include a MAC address of a Bluetooth chip, card, or module of the CDU 1802. In a preferred embodiment, the barcode 1808 is a two-dimensional barcode called a quick recovery (QR) code. The text 1806 and/or the barcode 1808 can also include authentication codes, such as a private key, to enable establishing secure connections between the user device and the Bluetooth module of the CDU 1802. In practice, a user device such as a PDA, smartphone, tablet, or the like, may include a camera module that can be used to capture an image of the hardware identifier 1804. A software application executing on the user device can allow a user initiated action to capture a QR code via the camera module. An example screenshot from a software application is presented in FIG. 14 whereby a user depressing the camera icon, located in the upper right hand corner, will activate the user device's internal camera and capture a QR code once it is present in the camera's field of view. Once activated the user device's camera can then digitize the information included in the text 1806 and/or the barcode 1808, e.g., using optical character recognition, for use by a device application as described in FIGS. 13-15. The device application, such as the one described in FIGS. 13-15, can be configured to decode, interpret, and/or extract information that is embedded and/or coded into QR codes by receiving and processing images captured with the camera module of the user device.

This disclosed use of the hardware identifier 1804 can also provide an advantage of reducing the time consumed for establishing a connection to the Bluetooth module. Typically, to establish a connection with another Bluetooth enabled device, a discovery procedure is executed to allow the user device to acquire the MAC address of the other Bluetooth device. However, by optically providing the MAC address of the other Bluetooth device, e.g., the CDU 1802, the user device can bypass the discovery procedure and begin pairing or bonding with the other Bluetooth device by sending connection requests with the MAC address for the target Bluetooth device. As mentioned above, briefly, the text 1806 and/or the barcode 1808 can also include a private key for use during the Bluetooth pairing procedure. By providing the MAC address and a security private key for the Bluetooth module, the hardware identifier 1804 can increase the convenience, speed, and security of establishing wireless connections with the CDU 1802.

In another embodiment, the hardware identifier 1804 can be implemented as an NFC or RFID tag. As a tag, the hardware identifier 1804 can still be fixed to any one of the number of surfaces of the equipment cabinet 1800. Similar to the optical implementation, the NFC tag can be used to provide the MAC address and/or private key associated with the Bluetooth module of the CDU 1802. The NFC tag can be embedded in a sticker and pre-coded with information useful for connecting to the Bluetooth module.

While the hardware identifier 1804 has been described as including information for facilitating Bluetooth connections, the hardware identifier 1804 can also include information for establishing other connections to the CDU 1802. For example, the hardware identifier 1804 can include an IP address or MAC address of a network card in the CDU 1802 to enable the user device to connect to the CDU 1802 via an intranet or the Internet. By providing connection information for a particular CDU in the disclosed manner, the user can be more confident that he or she is establishing a connection with the correct or with a desired CDU by reducing the chance that the user device is establishing a connection to a CDU of an adjacent or proximate equipment rack. While an electronic equipment cabinet 1800 is illustrated in FIG. 18, it should be noted that an equipment rack or other similar electronic equipment organizer could be substituted for the equipment cabinet 1800.

Figure 19:
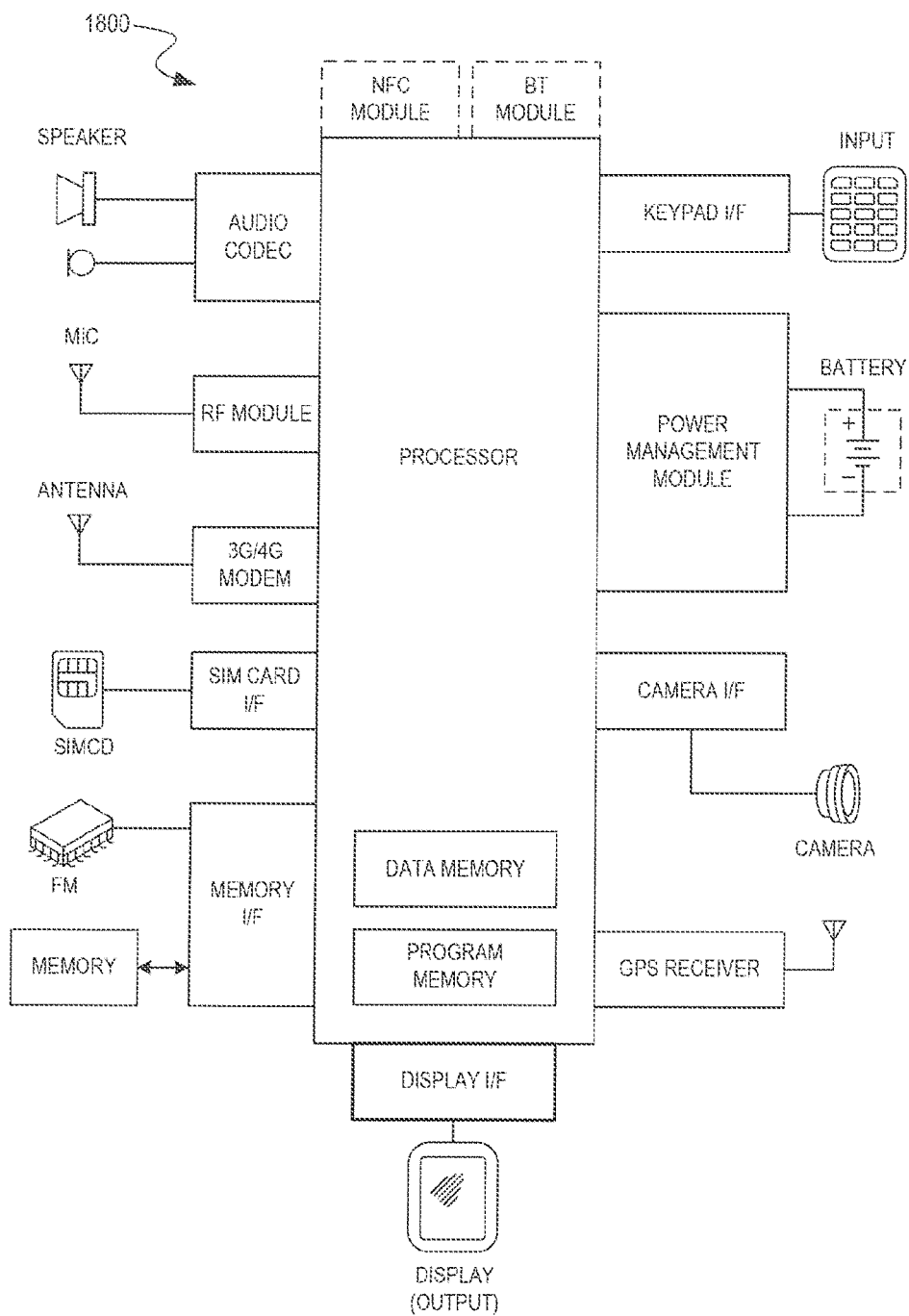
FIG. 19 depicts a block diagram illustrating the components of a representative user device in the form of a mobile (or smart) phone.

FIG. 19 depicts a block diagram illustrating the components of a representative user device 1900 in the form of a mobile (or smart) phone according to various embodiments. The user devices of various embodiments may include one or more processor module(s) and a memory that includes software that, when executed by processor module(s), cause the processor module(s) to perform various operations related to functions of the PDU on the mobile device. The user device includes various modules such as Bluetooth, NFC, WiFi, etc. for wireless communication with a PDU. Various user interfaces may be electronically presented to a user via a display. Input on the user device such as a touch screen can take input causing the application to automatically generate various SCP read and write commands. In some embodiments, the user interfaces presented to a user facilitate communications with the PDU allowing the user to obtain any desired information about the PDU and/or configure/reconfigure the PDU wirelessly from the user device.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A power distribution apparatus, comprising:
a housing having a power input, and a plurality of power outputs;
a communications module within the housing comprising a network connection interface and a wireless communications interface;
a network processor within the housing and in communication with the communication module; and
a wireless controller removably attachable to the wireless communications interface, wherein the wireless communications interface and the wireless controller are communicatively coupled when attached, and
wherein the communications module is configured to facilitate communications between the network processor and a wireless user device via the wireless controller when the wireless controller is removably attached to the wireless communications interface.

2. The apparatus of claim 1, further comprising:
a printed circuit board located in the housing, and wherein the communications module and the network processor are mounted on the printed circuit board.

3. The apparatus of claim 1, further comprising:
a tether configured to attach the wireless communications interface to the wireless controller.

4. The apparatus of claim 3, wherein the tether comprises a locking connector at one or more ends.

5. The apparatus of claim 4, wherein the RF interface comprises a Bluetooth interface.

6. The apparatus of claim 4, wherein the wireless controller further comprises:
a discoverability button configured to, when pressed, initiate broadcast of PDU discoverability information over the RF interface for a pre-determined period of time.

7. The apparatus of claim 4, wherein the wireless controller further comprises:
a status indicator configured to provide a visible connectivity status.

8. The apparatus of claim 1, wherein the wireless controller further comprises:
a serial interface configured to communicate with the network processor via the wireless communications interface; and
a radio frequency (RF) interface configured to wirelessly communicate with the user device via a wireless protocol.

9. The apparatus of claim 1, wherein the wireless controller comprises an NFC tag in communication with the network processor and configured to provide information from the network processor to an NFC enabled user device.

10. The apparatus of claim 9, further comprising a NFC antenna coupled with the NFC tag and mounted to the exterior of the housing.

11. The apparatus of claim 10, further comprising a tether coupled with the NFC antenna and securable to an NFC enabled user device.

12. The apparatus of claim 1, wherein the wireless controller comprises a Bluetooth interface in communication with the processor and configured to provide information from the network processor to a Bluetooth enabled user device.

13. The apparatus of claim 12, further comprising a Bluetooth antenna coupled with the Bluetooth interface and an impedance matching circuit coupled with the Bluetooth antenna that limits the range of RF transmissions between the wireless communications interface module and the Bluetooth enabled user device.

14. The apparatus of claim 1, wherein the wireless controller is configured to provide a communications tunnel between the network processor and an NFC enabled device.

15. The apparatus of claim 14, wherein the wireless communications interface provides an interface to a serial data bus located within the housing.

* * * * *